United States Patent [19]
Garde

[11] Patent Number: 5,954,811
[45] Date of Patent: *Sep. 21, 1999

[54] DIGITAL SIGNAL PROCESSOR ARCHITECTURE

[75] Inventor: Douglas Garde, Dover, Mass.

[73] Assignee: Analog Devices, Inc., Norwood, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/591,137

[22] Filed: Jan. 25, 1996

[51] Int. Cl.⁶ .................................................. G06F 12/00
[52] U.S. Cl. .............................. 712/35; 711/5; 711/119
[58] Field of Search ...................... 395/477, 480, 395/405, 800.35, 800.23, 381; 711/150, 153, 123, 119, 168, 214, 5; 365/189.04, 220, 230.03

[56] References Cited

U.S. PATENT DOCUMENTS

| | | | |
|---|---|---|---|
| H1291 | 2/1994 | Hinton et al. | 395/800.23 |
| 4,164,787 | 8/1979 | Aranguren | 364/200 |
| 4,410,964 | 10/1983 | Nordling et al. | 365/230.05 |
| 4,439,839 | 3/1984 | Kneib et al. | 364/900 |
| 4,574,345 | 3/1986 | Konesky | 364/200 |
| 4,641,238 | 2/1987 | Kneib | 364/200 |
| 4,754,394 | 6/1988 | Brantley, Jr. et al. | 364/200 |
| 4,800,524 | 1/1989 | Roesgen | 364/900 |
| 4,809,217 | 2/1989 | Floro et al. | 364/900 |
| 4,908,748 | 3/1990 | Pathak et al. | 364/200 |
| 5,010,476 | 4/1991 | Davis | 364/200 |
| 5,056,000 | 10/1991 | Chang | 364/200 |
| 5,099,417 | 3/1992 | Magar et al. | 395/425 |
| 5,151,979 | 9/1992 | Poskitt | 395/325 |
| 5,155,824 | 10/1992 | Edenfield et al. | 711/143 |
| 5,274,789 | 12/1993 | Costa et al. | 395/425 |
| 5,280,532 | 1/1994 | Shenoi et al. | 370/118 |
| 5,317,572 | 5/1994 | Satoh | 370/105.1 |
| 5,325,489 | 6/1994 | Mitsuhira et al. | 395/275 |
| 5,361,370 | 11/1994 | Sprague et al. | 395/800 |
| 5,390,304 | 2/1995 | Leach et al. | 395/375 |
| 5,404,522 | 4/1995 | Carmon et al. | 395/650 |
| 5,423,010 | 6/1995 | Mizukami | 395/375 |
| 5,438,666 | 8/1995 | Craft et al. | 395/842 |
| 5,471,607 | 11/1995 | Garde | 395/550 |
| 5,537,576 | 7/1996 | Perets et al. | 395/477 |
| 5,649,138 | 7/1997 | Ireton | 395/393 |

FOREIGN PATENT DOCUMENTS

WO90/07154  6/1990  WIPO.

OTHER PUBLICATIONS

C.P.Feigel, "TI Introduces Four–Processor DSP Chip", Microprocessor Report, Mar. 28, 1994, pp. 22–25.

P. Papamichalis et al, "The TMS320C30 Floating–Point Digital Signal Processor", IEEE Micro. Dec. 1988, pp. 13–29.

M.L. Fuccio et al, "The DSP32C; AT&T's Second–Generation Floating–Point Digital Signal Processor", IEEE Micro, Dec. 1988, pp. 30–48.

G.R.L. Sohie et al, "A Digital Signal Processor with IEEE Floating Point Arithmetic", IEEE Micro, Dec. 1988, pp. 49–67.

(List continued on next page.)

*Primary Examiner*—Meng-Ai T. An
*Assistant Examiner*—Walter D. Davis, Jr.
*Attorney, Agent, or Firm*—Wolf, Greenfield & Sacks, P.C.

[57] ABSTRACT

A high performance digital signal processor includes a memory for storing instructions and operands for digital signal computations and a core processor connected to the memory. The memory includes first, second and third memory banks connected to the core processor by first, second and third data and address buses, respectively. The core processor includes a program sequencer and first and second computation blocks for performing first and second subsets, respectively, of the digital signal computations. Single, dual or quad data words of 32 bits each may be accessed in each of the memory banks during each clock cycle. The multiple data words may be transferred to one or both of the first and second computation blocks.

24 Claims, 17 Drawing Sheets

OTHER PUBLICATIONS

"State of the Art Power PC 620 Soars", BYTE, Nov. 1994, pp. 114 and 116.

Texas Instruments, TMS320c3X, "User's Guide", Digital Signal Processing Products, 1991, pp. 5–24–5–28.

J.E. Brewer et al, "A Monolithic Processing Subsystem", IEEE Trans. On Components, Pack. & Manuf. Tech., Part B, vol. 17, No. 3, pp. 310–316, Aug. 1994.

J.E. Brewer et al, "A Single–Chip Digital Signal Processing Subsystem", 1994 Proceedings, Sixth Annual IEEE (ICWSI), San Francisco, CA, pp. 265–272, Jan. 1994.

T. Counihan et al. "On–chip Integrated Memories in DSP Architectures", Electronik, Jun. 14, 1994, Germany, vol. 43, No. 12, pp. 98–102, 104, 106.

IBM Technical Disclosure Bulletin, vol. 33, No. 10A, Mar. 1991, New York, pp. 1–5 Distributed Process Bulletin Board.

| TYPE(2:0), R(1:0) | | TRANSFER | CODING EXAMPLE |
|---|---|---|---|
| | | *SINGLE TRANSFERS* | |
| 000 | XX | A = SINGLE | af3 = D(I,M) |
| 001 | XX | B = SINGLE | bf3 = D(I,M) |
| 010 | XX | A,B = SINGLE (WR = 1) | f8 = D(I,M) |
| | | *DUAL TRANSFERS* | |
| 011 | XX | A = w1,B = w0 (READ OR WRITE) | abf3 = d D(I,M) |
| 100 | XX | B = w1,A = w0 (READ OR WRITE) | baf3 = d D(I,M) |
| 100 | X0 | A,B = DUAL (WR = 0) | f13:12 = d D(I,M) |
| 100 | X1 | NO ACCESS (MODIFY ONLY) | |
| 101 | X0 | A = DUAL | af13:12 = d D(I,M) |
| 101 | X1 | B = DUAL | bf13:12 = d D(I,M) |
| | | *QUAD TRANSFERS* | |
| 110 | 00 | A = w3,w2, B = w1,w0 (R/W) | abf15:14 = q D(I,M) |
| 110 | 01 | B = w3,w2, A = w1,w0 (R/W) | baf15:14 = q D(I,M) |
| 110 | 10 | A = w3,w1, B = w2,w0 (R/W) | abmf15:14 = q D(I,M) |
| 110 | 11 | B = w3,w1, A = w2,w0 (R/W) | bamf15:14 = q D(I,M) |
| 111 | 00 | A = QUAD | af15:12 = q D(I,M) |
| 111 | 01 | B = QUAD | bf15:12 = q D(I,M) |
| 111 | 10 | A, B = QUAD | f15:12 = q D(I,M) |

Fig. 6

DIGITAL SIGNAL PROCESSOR ARCHITECTURE

FIELD OF THE INVENTION

This invention relates to digital signal processors and, more particularly, to a digital signal processor architecture that facilitates high speed, complex digital signal processing computations.

BACKGROUND OF THE INVENTION

A digital signal computer, or digital signal processor (DSP), is a special purpose computer that is designed to optimize performance for digital signal processing applications, such as, for example, fast Fourier transforms, digital filters, image processing and speech recognition. Digital signal processor applications are typically characterized by real time operation, high interrupt rates and intensive numeric computations. In addition, digital signal processor applications tend to be intensive in memory access operations and to require the input and output of large quantities of data. Thus, designs of digital signal processors may be quite different from those of general purpose computers.

One approach that has been used in the architecture of digital signal processors to achieve high speed numeric computation is the Harvard architecture, which utilizes separate, independent program and data memories so that the two memories may be accessed simultaneously. This architecture permits an instruction and an operand to be fetched from memory in a single clock cycle. Frequently, the program occupies less memory space than the operands for the program. To achieve full memory utilization, a modified Harvard architecture utilizes the program memory for storing both instructions and operands. Typically, the program and data memories are interconnected with the core processor by separate program and data buses.

When both instructions and data (operands) are stored in the program memory, conflicts may arise in the fetching of instructions. Certain instruction types may require data fetches from the program memory. In the pipelined architecture which may be used in a digital signal processor, the data fetch required by an instruction of this type may conflict with a subsequent instruction fetch. Such conflicts have been overcome in prior art digital signal processors by providing an instruction cache. Instructions that conflict with data fetches are stored in the instruction cache and are fetched from the instruction cache on subsequent occurrences of the instruction during program execution. In general, the instruction cache is a satisfactory solution to conflicts for memory access. However, under certain circumstances problems may arise. For example, when a routine being executed repetitively does not fit in the instruction cache, that routine is executed relatively slowly, and performance is degraded. In addition, cache misses, which occur when the required instruction is not located in the instruction cache, reduce the speed of program execution.

Although the modified Harvard architecture used in conjunction with an instruction cache provides excellent performance, the need exists for further enhancements to the performance of digital signal processors. In particular, the marketplace requires increased computation rates and enhanced computation performance.

As described in *Byte*, November 1994, pages 114–116, the PowerPC 620 microprocessor utilizes a data cache having a 128 bit data bus. The data cache has the disadvantage that cache misses reduce the speed of program execution. In the PowerPC 620, up to four instructions are dispatched per cycle to the execution units.

SUMMARY OF THE INVENTION

According to the invention, a digital signal processor comprises a memory, including a first memory bank for storing instructions and second and third memory banks for storing operands for digital signal computations, and a core processor connected to the first, second and third memory banks. The core processor comprises a program sequencer for generating instruction addresses for fetching selected ones of the instructions from the first memory bank, and a computation unit for performing the digital signal computations using the instructions and the operands. The digital signal processor further comprises transfer selection means responsive to the instructions for selectably accessing single, dual or quad operands in one or both of the second and third memory banks during each clock cycle and providing the single, dual or quad operands to the computation unit for performing the digital signal computations.

The transfer selection means preferably further includes means for selectably writing single, dual or quad data words in one or both of the second and third memory banks during each clock cycle. In a preferred embodiment, the second and third memory banks each provide up to four operands of 32 bits each during each clock cycle.

The program sequencer may include means for fetching an instruction line including plural instructions from the first memory bank during each clock cycle. The first memory bank may be organized as quad word rows. The instructions are stored in the first memory bank as instruction lines of up to four instructions. The instructions of an instruction line are stored in one or two quad word rows of the first memory bank. The core processor may further include an instruction alignment buffer for aligning instructions that are read from the first memory bank on different clock cycles but are required to be executed in one clock cycle.

In a preferred embodiment, the computation unit includes a first computation block for performing a first subset of the digital signal computations using a first subset of the instructions and a first subset of the operands, and a second computation block for performing a second subset of the digital signal computations using a second subset of the instructions and a second subset of the operands. The first and second subsets of the instructions may be the same or different. The digital signal processor may further include first data and address buses interconnecting the core processor and the first memory bank, second data and address buses interconnecting a core processor and the second memory bank, and third data and address buses interconnecting the core processor and the third memory bank. The transfer selection means may include means for selectably transferring dual operands in a quad operand to one or both of the first and second computation blocks during each clock cycle. The transfer selection means may further include means for selectably transferring single operands in a dual operand to one or both of the first and second computation blocks during each clock cycle. In addition, the transfer selection means may include means for selectably transferring a quad operand to one or both of the first and second computation blocks during each clock cycle.

According to another aspect of the invention, a method for digital signal processing is provided. Instructions for digital signal computations are stored in a first memory bank, and operands for the digital signal computations are stored in a second memory bank. The method includes the steps of generating instruction addresses for fetching selected ones of the instructions from the first memory bank, selectably accessing single, dual or quad operands in the second memory bank during each clock cycle and providing the single, dual or quad operands to a computation unit for performing the digital signal computations. The computation unit performs the digital signal computations using the instructions from the first memory bank and the single, dual or quad operands from the second memory bank.

According to a further aspect of the invention, a digital signal processor comprises a memory, including a first memory bank for storing instructions and a second memory bank for storing operands for digital signal computations, and a core processor connected to the first and second memory banks. The core processor comprises a program sequencer for generating instruction addresses for fetching selected ones of the instructions from the first memory bank, and a computation unit for performing the digital signal computations using the instructions and the operands. The digital signal processor further comprises transfer selection means responsive to the instructions for selectably accessing single, dual or quad operands in the second memory bank during each clock cycle and providing the single, dual or quad operands to the computation unit for performing the digital signal computations. The digital signal processor may include an instruction cache for storing instructions being executed. When instructions are stored in an instruction cache, the transfer selection means may selectably access single, dual or quad operands in one or both of the first and second memory banks.

BRIEF DESCRIPTION OF THE DRAWINGS

For a better understanding of the present invention, reference is made to the accompanying drawings, which are incorporated herein by reference in which:

FIG. 6 is a table that illustrates data transfer types in the digital signal processor of FIG. 1;

DETAILED DESCRIPTION

Figure 1:
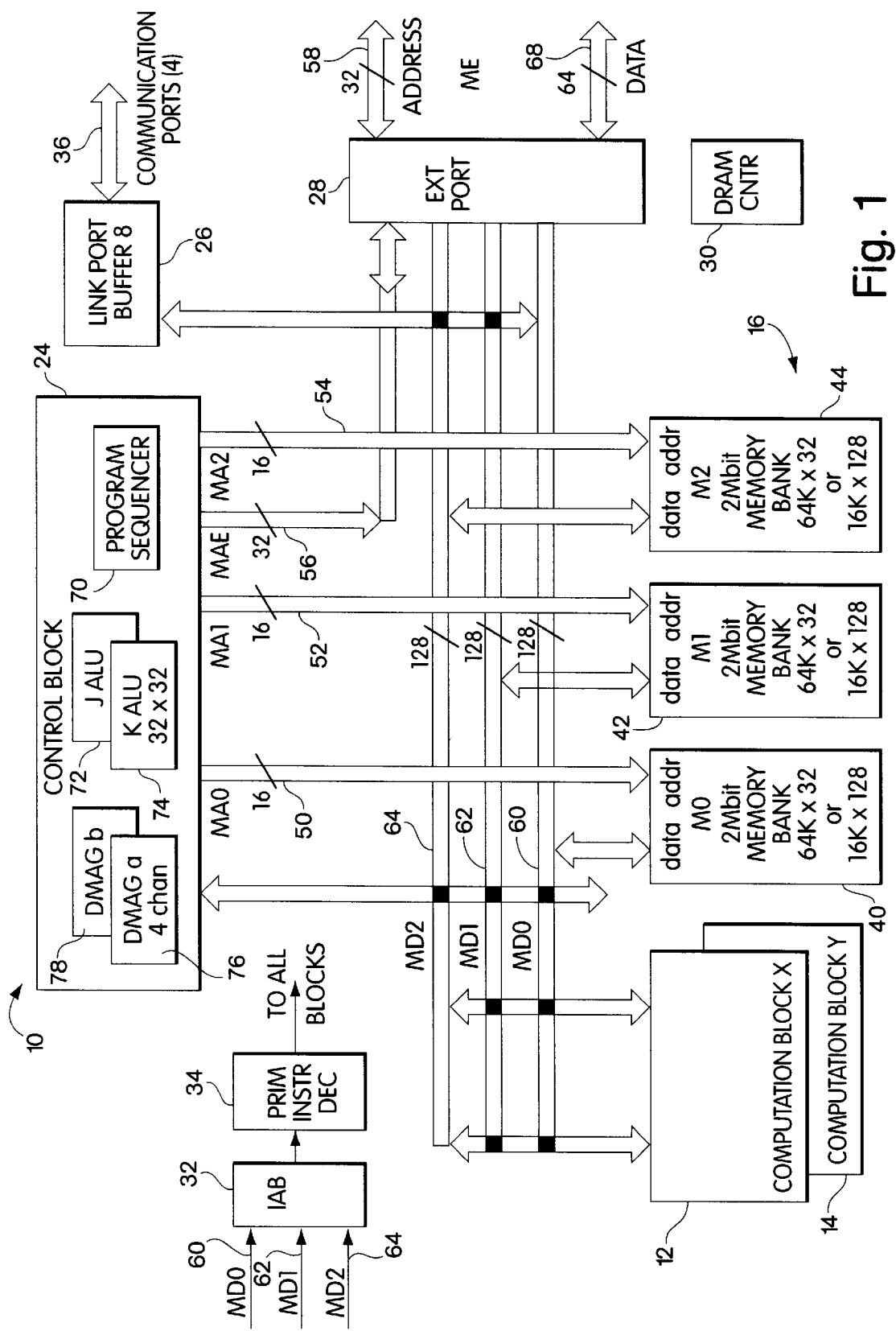
FIG. 1 is a block diagram of a digital signal processor in accordance with the present invention.

A block diagram of a digital signal processor (DSP) 10 in accordance with the present invention is shown in FIG. 1. The principal components of DSP 10 are computation blocks 12 and 14, a memory 16, a control block 24, link port buffers 26, an external port 28, a DRAM controller 30, an instruction alignment buffer (IAB) 32 and a primary instruction decoder 34. The computation blocks 12 and 14, the instruction alignment buffer 32, the primary instruction decoder 34 and the control block 24 constitute a core processor which performs the main computation and data processing functions of the DSP 10. The external port 28 controls external communications via an external address bus 58 and an external data bus 68. The link port buffers 26 control external communication via communication ports 36. The DSP is preferably configured as a single monolithic integrated circuit and is preferably fabricated using a 0.35 micron gate, four metal, SRAM CMOS process. In a preferred embodiment, an external clock (not shown) at a frequency of 41.5 MHZ is internally multiplied by four to provide an internal clock at 166 MHZ.

The memory 16 includes three independent, large capacity memory banks 40, 42 and 44. In a preferred embodiment, each of the memory banks 40, 42 and 44 has a capacity of 64K words of 32 bits each. As discussed below, each of the memory banks 40, 42 and 44 preferably has a 128 bit data bus. Up to four consecutive aligned data words of 32 bits each can be transferred to or from each memory bank in a single clock cycle.

The elements of the DSP 10 are interconnected by buses for efficient, high speed operation. Each of the buses includes multiple lines for parallel transfer of binary information. A first address bus 50 (MA0) interconnects memory bank 40 (M0) and control block 24. A second address bus 52 (MA1) interconnects memory bank 42 (M1) and control block 24. A third address bus 54 (MA2) interconnects memory bank 44 (M2) and control block 24. Each of the address buses 50, 52 and 54 is preferably 16-bits wide. An external address bus 56 (MAE) interconnects external port 28 and control block 24. The external address bus 56 is interconnected through external port 28 to external address bus 58. Each of the external address buses 56 and 58 is preferably 32 bits wide. A first data bus 60 (MD0) interconnects memory bank 40, computation blocks 12 and 14, control block 24, link port buffers 26, IAB 32 and external port 28. A second data bus 62 (MD1) interconnects memory bank 42, computation blocks 12 and 14, control block 24, link port buffers 26, IAB 32 and external port 28. A third data bus 64 (MD2) interconnects memory bank 44, computation blocks 12 and 14, control block 24, link port buffers 26, IAB 32 and external port 28. The data buses 60, 62 and 64 are connected through external port 28 to external data bus 68. Each of the data buses 60, 62 and 64 is preferably 128 bits wide, and external data bus 68 is preferably 64 bits wide.

The first address bus 50 and the first data bus 60 comprise a bus for transfer of data to and from memory bank 40. The second address bus 52 and the second data bus 62 comprise a second bus for transfer of data to and from memory bank 42. The third address bus 54 and the third data bus 64 comprise a third bus for transfer of data to and from memory bank 44. Since each of the memory banks 40, 42 and 44 has a separate bus, the memory banks 40, 42 and 44 may be accessed simultaneously. As used herein, "data" refers to binary words, which may represent either instructions or operands that are associated with the operation of the DSP 10. In a typical operating mode, program instructions are stored in one of the memory banks, and operands are stored in the other two memory banks. Thus, at least one instruction and two operands can be provided to computation blocks 12 and 14 in a single clock cycle. As described below, each of the memory banks 40, 42, and 44 is configured to permit reading and writing of multiple data words in a single clock cycle. The simultaneous transfer of multiple data words from each memory bank in a single clock cycle is accomplished without requiring an instruction cache or a data cache.

The control block 24 includes a program sequencer 70, a first integer ALU 72 (J ALU), a second integer ALU 74 (K ALU), a first DMA address generator 76 (DMAG A) and a second DMA address generator 78 (DMAG B). The integer ALU's 72 and 74, at different times, execute integer ALU instructions and perform data address generation. During execution of a program, the program sequencer 70 supplies a sequence of instruction addresses on one of the address buses 50, 52, 54 and 56, depending on the memory location of the instruction sequence. Typically, one of the memory banks 40, 42 or 44 is used for storage of the instruction sequence. Each of the integer ALU's 72 and 74 supplies a data address on one of the address buses 50, 52, 54 and 56, depending on the location of the operand required by the instruction. Assume, for example, that an instruction sequence is stored in memory bank 40 and that the required operands are stored in memory banks 42 and 44. In this case, the program sequencer supplies instruction addresses on address bus 50 and the accessed instructions are supplied to the instruction alignment buffer 32, as described below. The integer ALU's 72 and 74 may, for example, output addresses of operands on address buses 52 and 54, respectively. In response to the addresses generated by integer ALU's 72 and 74, the memory banks 42 and 44 supply operands on data buses 62 and 64, respectively, to either or both of the computation blocks 12 and 14. The memory banks 40, 42 and 44 are interchangeable with respect to storage of instructions and operands.

The program sequencer 70 and the integer ALU's 72 and 74 may access an external memory (not shown) via external port 28. The desired external memory address is placed on address bus 56. The external address is coupled through external port 28 to external address bus 58. The external memory supplies the requested data word or data words on external data bus 68. The external data is supplied via external port 28 and one of the data buses 60, 62 and 64 to one or both of computation blocks 12 and 14. The DRAM controller 30 controls the external memory.

As indicated above, each of the memory banks 40, 42 and 44 preferably has a capacity of 64k words of 32 bits each. Each memory bank may be connected to a data bus that is 128 bits wide. In an alternative embodiment, each data bus may be 64 bits wide, and 64 bits are transferred on each of clock phase 1 and clock phase 2, thus providing an effective bus width of 128 bits. Multiple data words can be accessed in each memory bank in a single clock cycle. Specifically, data can be accessed as single, dual or quad words of 32 bits each. Dual and quad accesses require the data to be aligned in memory. Typical applications for quad data accesses are the fast Fourier transform (FFT) and complex FIR filters. Quad accesses also assist double precision operations. Preferably, instructions are accessed as quad words. However, as discussed below, instructions are not required to be aligned in memory.

Using quad word transfers, four instructions and eight operands, each of 32 bits, can be supplied to the computation blocks 12 and 14 in a single clock cycle. The number of data words transferred and the computation block or blocks to which the data words are transferred are selected by control bits in the instruction. The single, dual, or quad data words can be transferred to computation block 12, to computation block 14, or to both. Dual and quad data word accesses improve the performance of the DSP 10 in many applications by allowing several operands to be transferred to the computation blocks 12 and 14 in a single clock cycle. The ability to access multiple instructions in each clock cycle allows multiple operations to be executed in each cycle, thereby improving performance. If operands can be supplied faster than they are needed by the computation blocks 12 and 14, then there are memory cycles left over that can be used by the DMA address generators 76 and 78 to provide new data to the memory banks 40, 42 and 44 during those unused cycles, without stealing cycles from the core processor. Finally, the ability to access multiple data words makes it possible to utilize two or more computation blocks and to keep them supplied with operands. The ability to access single or dual data words reduces power consumption in comparison with a configuration where only quad data words are accessed.

Figure 2:
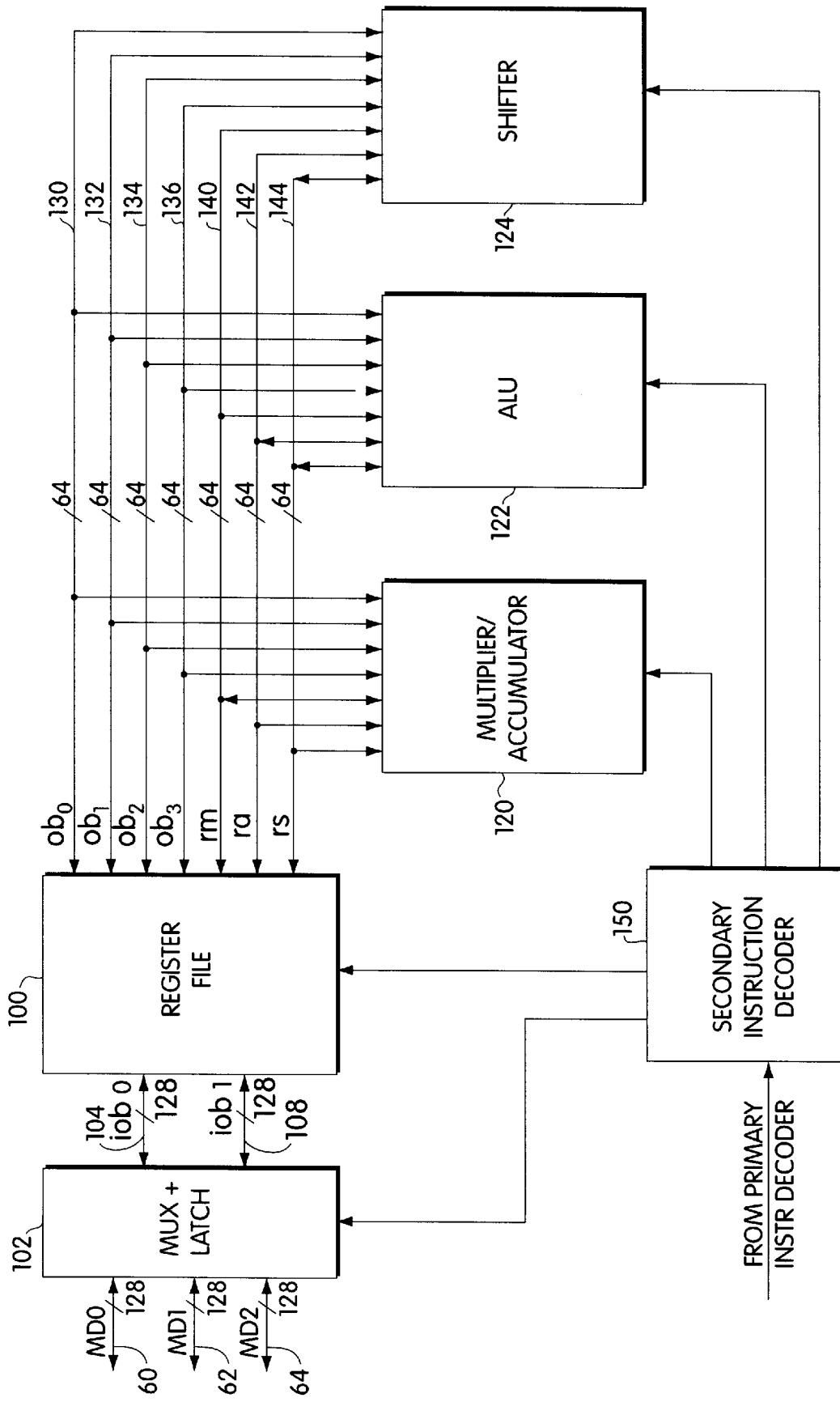
FIG. 2 is a block diagram representative of each computation block shown in FIG. 1.

A block diagram of an exemplary embodiment of each of the computation blocks 12 and 14 is shown in FIG. 2. A multiple port register file 100 provides temporary storage for operands and results. In a preferred embodiment, the register file 100 has a capacity of 32 words of 32 bits each, organized as 8 rows of 128 bits each. The register file 100 is connected through a multiplexer and latch 102 to each of the data buses 60, 62 and 64. When operands are fetched from memory 16, two of the three data buses are selected, and the operands on the selected buses are supplied to the register file 100 on bus 104 (iob0) and bus 108 (iob1), each of which is 128 bits wide. When data is being written from the register file 100 to memory 16 or to an external memory, the data is supplied to multiplexer and latch 102 on buses 104 and 108. The output data on buses 104 and 108 is switched by multiplexer and latch 102 to selected ones of the data buses 60, 62 and 64 for writing to memory. In addition to selecting two of the three data buses 60, 62 and 64, the multiplexer and latch 102 permits word selection within each bus under instruction control. In the case of single word transfers, the multiplexer and latch 102 may or may not select the accessed data word. In the case of dual word transfers, the multiplexer and latch 102 may select either or both data words. In the case of quad word transfers, the multiplexer and latch 102 may select different combinations of dual data words or may select the entire quad data word. Different data transfer types that may be selected are shown in FIG. 6 and described below.

The computation block shown in FIG. 2 includes a multiplier/accumulator 120, an arithmetic logic unit (ALU) 122 and a shifter 124. The multiplier/accumulator 120, the ALU 122 and the shifter 124 are capable of simultaneous execution of instructions to the extent that sufficient instructions and operands can be supplied to the computation block. Operands are supplied from the register file 100 to multiplier/accumulator 120, ALU 122 and shifter 124 on four operand buses 130 (ob0), 132 (ob1), 134 (ob2) and 136 (ob3). Each of the operand buses 130, 132, 134 and 136 is 64 bits wide. Results from the multiplier/accumulator 120 are returned to the register file 100 on a result bus 140 (rm). Results from the ALU 122 are returned to the register file 100 on a result bus 142 (ra) and a result bus 144 (rs). Results from the shifter 124 are returned to the register file 100 on result bus 144. The result buses 140, 142 and 144 are connected to each of the computation units, including multiplier/accumulator 120, ALU 122 and shifter 124, so that each computation unit can obtain operands directly from the result buses 140, 142 and 144. Each of the result buses 140, 142 and 144 is preferably 64 bits wide. Addressing of the register file 100 and control signals for the multiplexer and latch 102, multiplier/accumulator 120, ALU 122 and shifter 124 are provided from a secondary instruction decoder 150. The secondary instruction decoder 150 decodes instructions supplied from the primary instruction decoder 34 (FIG. 1). Each of the two computation blocks 12 and 14 may execute up to three instructions in the same clock cycle, one each for the multiplier/accumulator 120, the ALU 122 and the shifter 124.

In the architecture illustrated in FIG. 1, the instruction alignment buffer 32 and the primary instructor decoder 34 are centralized. Instructions fetched from one of the memory banks 40, 42 and 44 are supplied to instruction alignment buffer 32 on one of the data buses 60, 62 and 64. The instructions are aligned for execution in the clock cycle required by the instruction sequence and are partially decoded by the primary instruction decoder 34. The partially decoded instructions are supplied to the appropriate block in the DSP 10. For example, the instructions may be supplied to one or both of the computation blocks 12 and 14 or to the control block 24. Decoding of the instruction is completed by the block which utilizes the instruction. For example, as shown in FIG. 2, the secondary instruction decoder 150 completes decoding of computation instructions.

Figure 3:
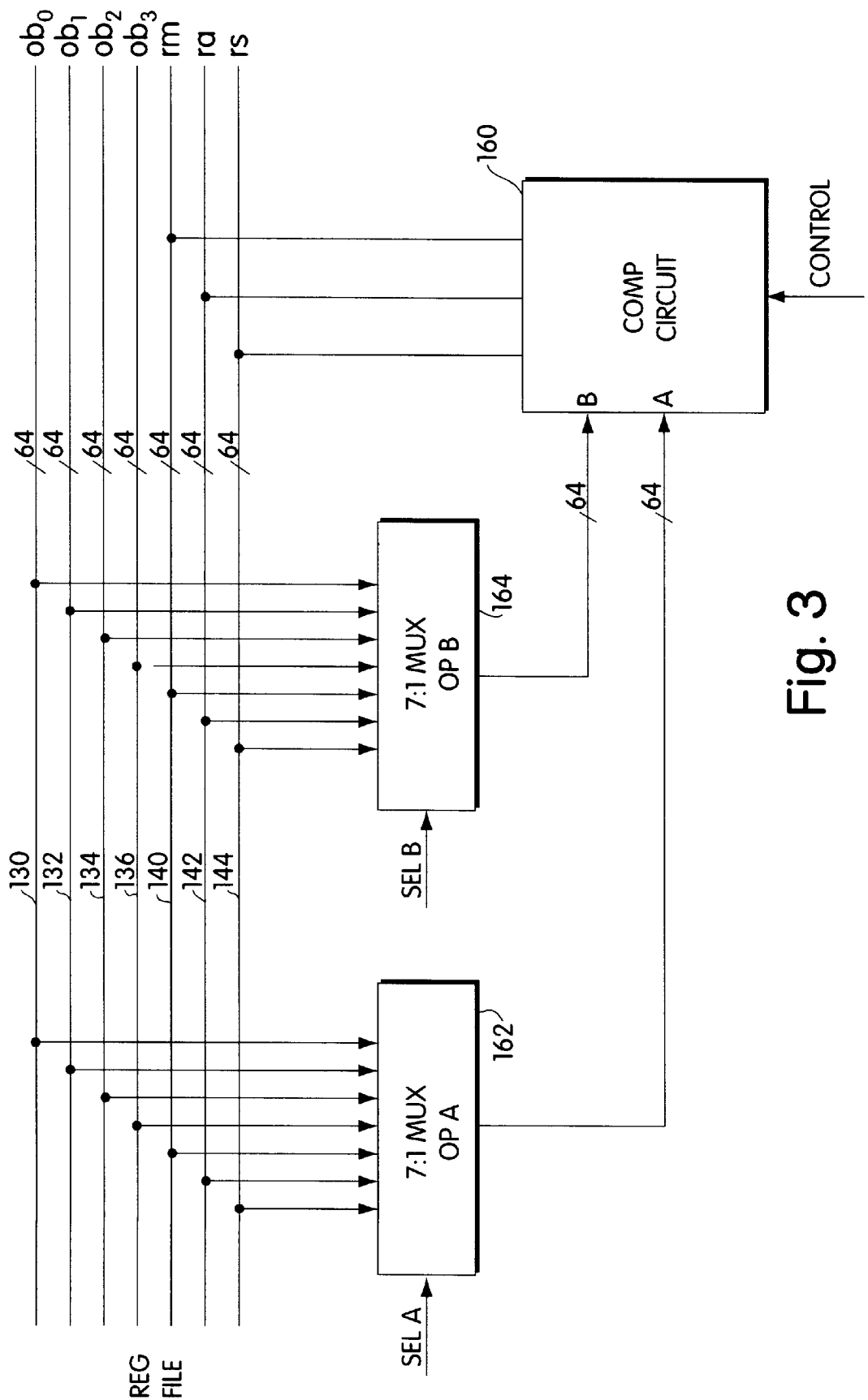
FIG. 3 is a block diagram representative of each computation unit shown in FIG. 2.

The multiplier/accumulator 120, ALU 122 and shifter 124 are the computation units of the computation block. A block diagram representative of each computation unit is shown in FIG. 3. Each computation unit includes a computation circuit 160 that receives operand A from a multiplexer 162 and operand B from a multiplexer 164. The multiplexer 162 selects operand A from one of the output buses 130, 132, 134 and 136 of register file 100 or from one of the result buses 140, 142 and 144. Similarly, the multiplexer 164 selects operand B from one of the output buses 130, 132, 134 and 136 of register file 100 or from one of the result buses 140,142 and 144. Each of the operands supplied to computation circuit 160 is 64 bits wide. The computation circuit 160 receives control signals from secondary instruction decoder 150 (FIG. 2) and supplies results on one or more of the result buses 140, 142 and 144 as described above. The configuration shown in FIG. 3 has the advantage that each computation unit can obtain operands directly from the result buses 140, 142 and 144 without requiring the result to be first stored in the register file 100.

The DSP 10 preferably has a pipelined architecture. The computation blocks 12 and 14 may have a two-stage pipeline, and the control block 24 may have a six-stage pipeline. The six stages are as follows: (1) fetch, (2) fetch, (3) decode, (4) integer execute, (5) floating point execute and (6) floating point execute. During the first fetch cycle, the instruction address is output by the program sequencer 70. The instruction is received at the end of the second fetch cycle. The fetched instruction is decoded in the decode cycle, and integer and data address calculations are begun. In the integer execute cycle, integer calculations are completed, addresses are prepared for the data fetch in the next cycle and register file accesses in the computation blocks are begun. In the first floating point execute cycle, the data access resulting from the previous data address calculation is begun. Operands from the register file or from the memory access that just completed are available to the computation units in the computation blocks. In the second floating point execute cycle, the computation units complete their operations. The results are written back to the register file, and may be written to one of the other computation units in the same computation block, in the following cycle. The pipelined architecture permits memory 16 to be pipelined to achieve fast access and permits the units in the DSP 10 to operate twice as fast as a non-pipelined architecture.

Figure 4:
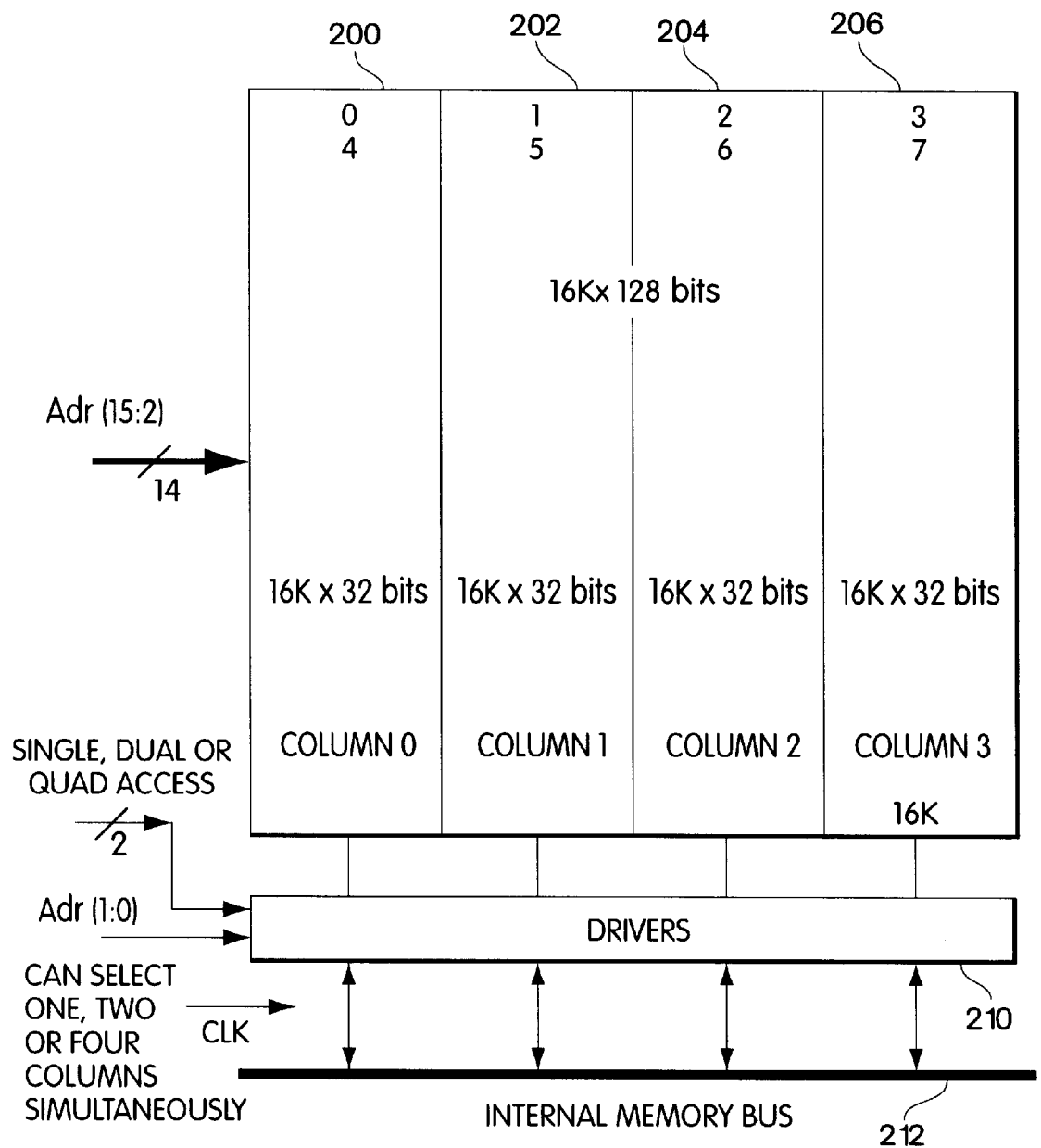
FIG. 4 is a block diagram representative of each memory bank shown in FIG. 1.

A block diagram representative of each of the memory banks 40, 42 and 44 is shown in FIG. 4. Each memory bank is organized as four columns 200, 202, 204 and 206 of memory locations. In this example, each column is organized as 16K words of 32 bits each. The addresses increase linearly across columns 200, 202, 204 and 206. The data lines for each of the columns 200, 202, 204 and 206 are connected through drivers 210 to a data bus 212. The data bus 212 corresponds to one of the data buses 60, 62 and 64 shown in FIG. 1 and described above. Data bus 212 is preferably 128 bits wide. Address bits (15:2) are supplied to columns 200, 202, 204 and 206, and address bits (1:0) are supplied to drivers 210. The address bits supplied to columns 200, 202, 204 and 206 address a row of four consecutive aligned data words of 32 bits each, one in each column. The drivers 210 receive a two bit signal which indicates whether a single, dual or quad data word is being accessed. As described above, single, dual or quad word transfers may be performed in a single clock cycle.

For single word transfers, address bits (15:2) select a row of four consecutive aligned data words, and the address bits (1:0) select one of the columns 200, 202, 204 and 206. The drivers 210 drive the selected word onto the bus 212.

For dual word transfers, address bits (15:2) select a row of four consecutive aligned data words, and address bit (1) selects a pair of adjacent columns. Columns 200 and 202 or columns 204 and 206 may be selected. The selected dual words are driven onto data bus 212 by drivers 210.

For quad word transfers, consecutive aligned words in columns 200, 202, 204 and 206 are selected by address bits (15:2). The quad words are driven onto data bus 212 by drivers 210. For single, dual and quad word transfers, the selected words are preferably driven directly onto data bus 212 without left or right shifting.

Figure 5:
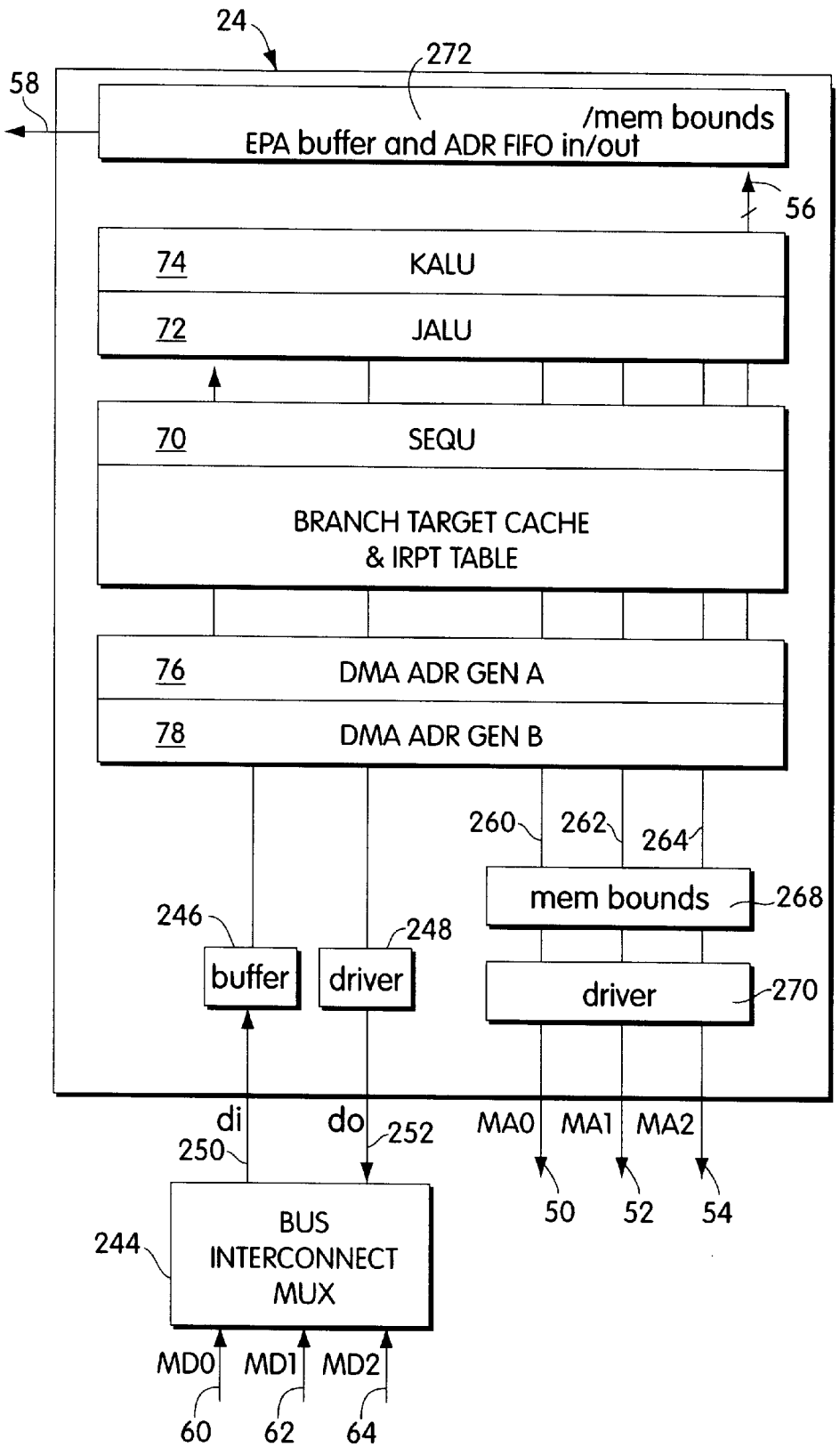
FIG. 5 is a block diagram of the control block shown in FIG. 1.

A block diagram of the control block 24 is shown in FIG. 5. The control block 24 includes program sequencer 70, integer ALU's 72 and 74 and DMA address generators 76 and 78, as described above. A bus interconnect multiplexer 244 connects a data in bus 250 (di) and a data out bus 252 (do) to the appropriate data buses 60, 62 and 64. The data in bus 250 is connected through a buffer 246 to the program sequencer 70, the integer ALU's 72 and 74 and the DMA address generators 76 and 78. The program sequencer 70, the integer ALU's 72 and 74 and the DMA address generators 76 and 78 are connected through drivers 248 to the data out bus 252. Address buses 260, 262 and 264 are connected to the program sequencer 70, integer ALU's 72 and 74 and DMA address generators 76 and 78 within control block 24. The address buses 260, 262 and 264 are connected through memory bounds registers 268 and drivers 270 to address buses 50, 52 and 54, respectively, for fetching instructions and operands. The external address bus 56 is connected through an address buffer and FIFO 272, which is logically part of external port 28, to external address bus 58.

As described above, single dual or quad data words may be accessed in each of the memory banks 40, 42 and 44. Accessed data words are placed on the appropriate data buses and are selectively utilized by computation blocks 12 and 14 and control block 24 under instruction control. This configuration provides great flexibility in the types of operations that may be performed by the DSP 10. In addition, the ability to transfer up to eight data words of 32 bits each per clock cycle permits multiple operations to be performed simultaneously.

A table summarizing the types of memory transfers that may be selected in the DSP 10 is shown in FIG. 6. The transfers shown in FIG. 6 are transfers of operands. The transfer of instructions is described below. The memory transfer type is controlled by bits in the instruction. Instructions that require data transfer include type bits, which specify a transfer type, and register bits, which specify a destination or source register. The registers in the DSP 10 are divided into multiple groups, including computation block 12 (A), computation block 14 (B), control block 24, link port 26 and external port 28. The registers in computation blocks 12 and 14 correspond to register file 100 shown in FIG. 2. The transfer type is specified by type bits (2:0) and register bits (1:0) in the instruction. As shown in FIG. 6, a single word transfer may involve a transfer of a single word to computation block A, computation block B or to both. In dual word transfers, computation block A may receive word W1, and computation block may receive word W0. Conversely, computation block B may receive word W1, and computation block A may receive word W0. In other dual word transfer types, words W0 and W1 may be transferred to computation block A alone, to computation block B alone or to both computation blocks A and B. As shown in FIG. 6, quad word transfers may involve transfers of two data words to computation block A and two other data words to computation block B, in various combinations. In addition, the four data words of the quad word may be transferred to computation block A, to computation block B, or to both computation blocks A and B.

Any of the transfer types shown in FIG. 6 may be utilized for reading data words from memory and transferring the data words to the computation blocks. Furthermore, the various transfer types may be utilized for writing data from one or both of the computation blocks to memory, except for the transfer types where data words are transferred from both computation blocks to the same memory location. Both computation blocks cannot write to the same memory location simultaneously. However, the two computation blocks can write to different locations in the same dual or quad data word simultaneously.

Figure 7:
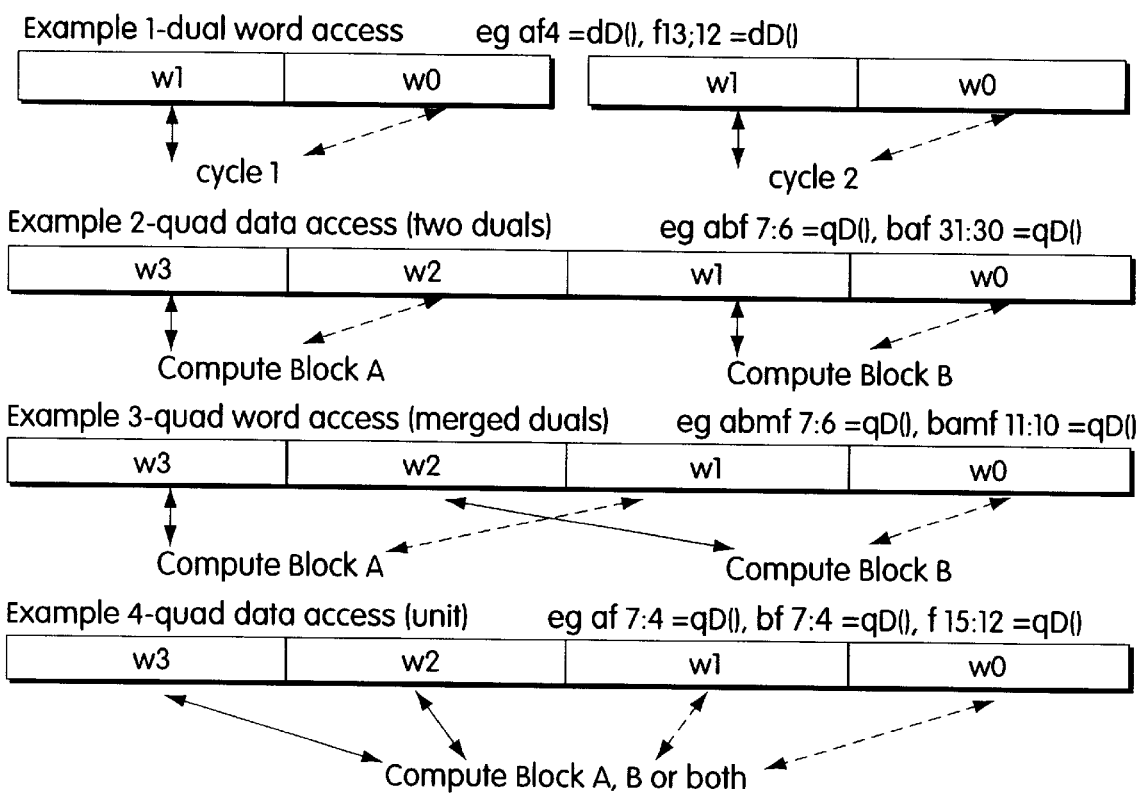
FIG. 7 illustrates examples of data transfers in the digital signal processor of FIG. 1.

Examples of dual and quad word data transfers are illustrated in FIG. 7. In example 1, dual word transfers are illustrated. Dual data words W0 and W1 are transferred on each cycle. In examples 2–4, quad data transfers are illustrated. In example 2, data words W3 and W2 are transferred to computation block A, and data words W1 and W0 are transferred to computation block B. In example 3, data words W3 and W1 are transferred to computation block A, and data words W2 and W0 are transferred to computation block B. In example 4, data words W0, W1, W2 and W3 may be transferred to computation block A, computation block B or both. In examples 1–4, data words W3 and W1 may represent the real component of a complex number, and data words W2 and W0 may represent the imaginary component of a complex number.

As indicated above, four data words are addressed simultaneously in the memory bank of FIG. 4 to permit single, dual or quad data words to be accessed in a single clock cycle. The data stored in the memory bank is preferably aligned with respect to each four word row of data words in the memory bank. Thus, all data required to perform a particular computation is stored in a single four word row of the memory bank. For example, each four word row may contain real and imaginary components of two complex numbers. The data is also aligned when dual word access is utilized. In each case, the data is stored in the memory bank to avoid unused locations.

In a manner similar to operands, instructions are stored in one of the memory banks as single, dual or quad data words in each four word row of the memory bank. However, in contrast to operands, instructions are preferably always accessed as quad words. Furthermore, in order to achieve full memory utilization, instructions are not necessarily aligned in memory. Instead, an instruction line, defined as one or more instructions to be executed in a single clock cycle, may be stored in one or two different four word rows of the memory bank. The beginning and end of each instruction line are identified by bits in the instructions. A line bit B may be used to indicate both the start of an instruction line and the end of an instruction line. Thus, for example, a four word instruction line may have three words of the instruction line stored in one four word row of the memory bank and the fourth instruction word stored in the next four word row of the memory bank.

Figure 8:
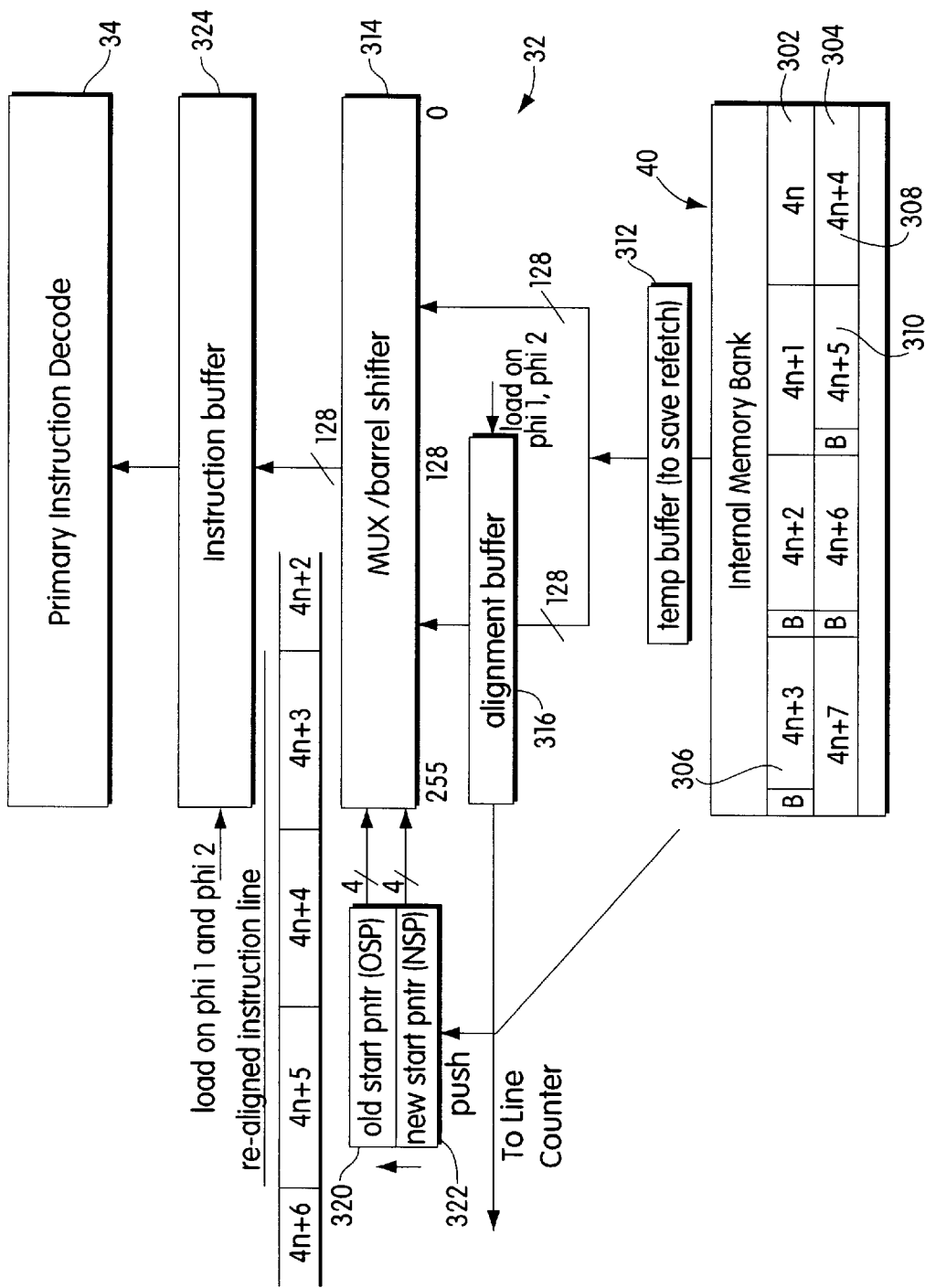
FIG. 8 is a block diagram of an instruction alignment buffer used in the digital signal processor of FIG. 1.

When instruction lines are stored in the memory bank without being aligned in memory rows, it is necessary to align the instructions for execution in the same clock cycle. More specifically, the instructions of an instruction line may be accessed in two successive clock cycles, but must be aligned for execution in a single clock cycle. A block diagram of the instruction alignment buffer 32 and the primary instruction decoder 34 is shown in FIG. 8. A secondary instruction decoder is included in each block of the DSP 10 which requires instruction decoding.

As described above, each memory bank is organized as rows of four consecutive 32-bit words. Memory rows 302 and 304 of memory bank 40 are illustrated in FIG. 8. In the example of FIG. 8, an instruction line of three instructions includes an instruction 306 at location $4n+3$ in memory row 302 and instructions 308 and 310 at locations $4n+4$ and $4n+5$, respectively, in memory row 304. The instruction 310 at location $4n+5$ includes a line bit B, which indicates the beginning of the instruction line, and instruction 306 at location $4n+3$ includes a line bit B, which indicates the end of the same instruction line. Thus, two consecutive line bits B indicate a transition between instruction lines.

Memory row 302 is transferred from memory bank 40 through a temporary buffer 312 to bits 0–127 of a multiplexer/barrel shifter 314 having 256 bits and to an alignment buffer 316 on a first clock cycle. On a second clock cycle, the contents of alignment buffer 316 are transferred to bits 128–255 of multiplexer/barrel shifter 314, and memory row 304 is transferred to bits 0–127 of the multiplexer/barrel shifter 314 and to alignment buffer 316. The multiplexer/barrel shifter 314 receives an old start pointer 320 (OSP), which indicates the location of the beginning of the instruction line, and a new start pointer 322 (NSP), which indicates the beginning of the next instruction line. The old start pointer and the new start pointer are determined from the line bits B in the instructions. The instructions in memory rows 302 and 304 are combined in multiplexer/barrel shifter 314 and are shifted by an appropriate number of word locations to provide a realigned instruction line. The output of multiplexer/barrel shifter 314 is a realigned instruction line wherein instructions 306, 308 and 310 are supplied to an instruction buffer 324 in a single clock cycle. The realigned instruction line stored in instruction buffer 324 is supplied to primary instruction decoder 34 for partial decoding.

Figure 9:
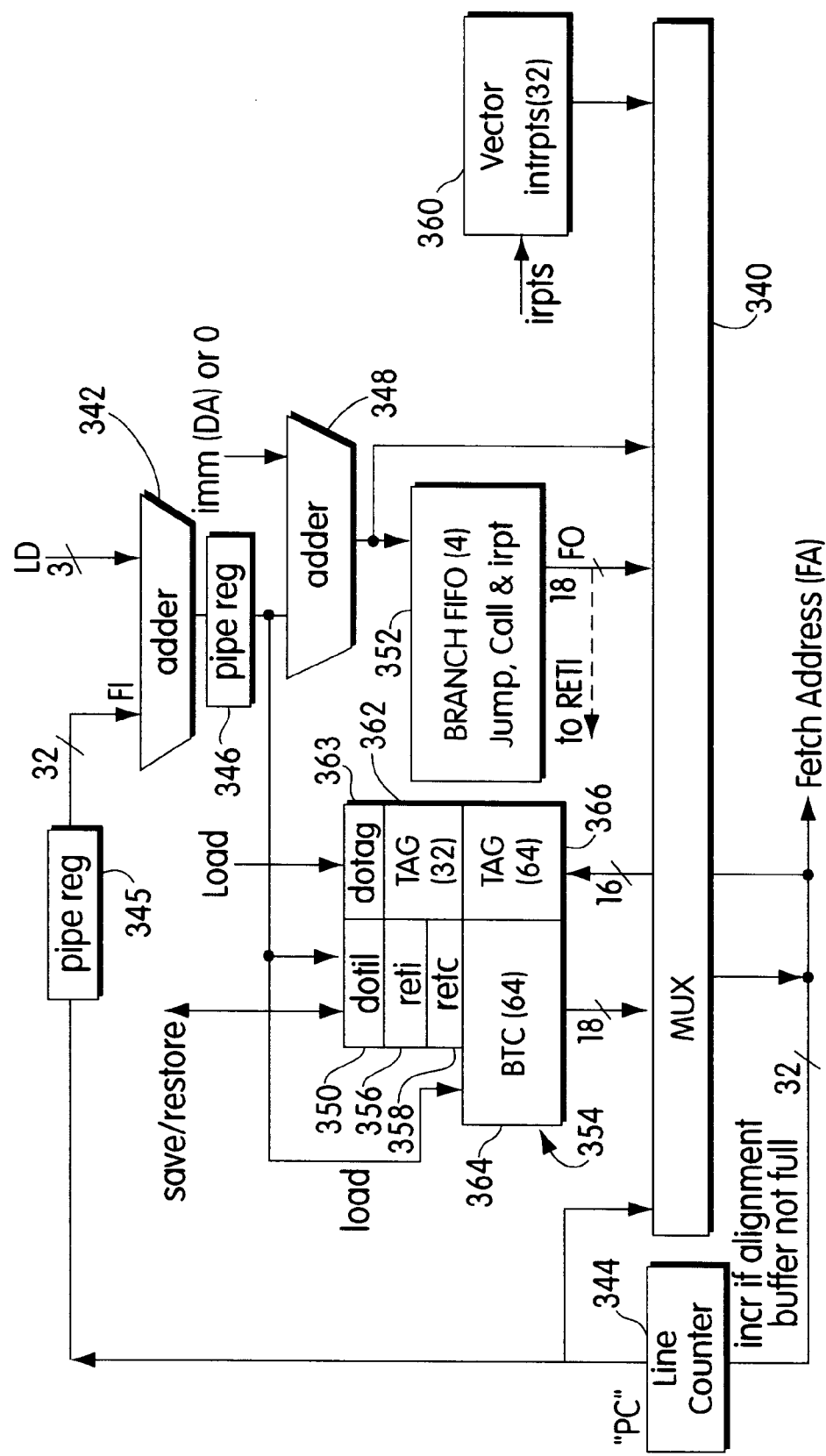
FIG. 9 is a block diagram of the program sequencer of FIG. 1.

A block diagram of the program sequencer 70 is shown in FIG. 9. The program sequencer 70 controls sequencing of instructions for the computation blocks 12 and 14 and for the integer ALU's 72 and 74. A fetch address (FA) is supplied by a multiplexer 340 from one of several sources. An adder 342 receives an output F1 of a line counter 344 through a pipeline register 345 and receives a line delta (LD), which indicates the location of a jump or call instruction within an instruction line. The line delta is not known until two cycles after the jump or call instruction is addressed. The output of adder 342 is supplied through a pipeline register 346 to one input of an adder 348, to a return interrupt register 356 (RETI), to a return call register 358 (RETC), to a do-until target register 350 and to a target address file 364 of a branch target cache 354. When nested jumps/calls/interrupts occur, the return addresses in the registers 356 and 358 are saved to and restored from a C stack in the memory via a save/restore bus. A tag file 362 contains the addresses of return instructions in different jump/call/interrupt routines. A do-until tag file 363 contains the addresses of return instructions in different do-until routines. The adder 348 may receive an imm (DA) signal from the instructions. The value of imm (DA) may represent a jump. The adders 342 and 348 together produce a jump of LD+imm (DA). The output of adder 348 is supplied to a branch FIFO 352 and to a first input of multiplexer 340. The output F0 of branch FIFO 352 is supplied to a second input of multiplexer 340. The output of branch target cache 354 is supplied to a third input of multiplexer 340. Multiplexer 340 also receives the output PC of line counter 344. A vector interrupt register 360 supplies interrupt addresses to yet another input of multiplexer 340. The Fetch Address (FA) output of multiplexer 340 is supplied to line counter 344 and to a tag file 366 of branch target cache 354. The Fetch Address is the address of an instruction to be fetched from one of the memory banks 40, 42 and 44.

The branch FIFO 352 is 4 deep to allow successive jumps/calls/interrupts to be undone if a false jump/call occurs. After a false jump or call, the program counter equals F0 (the branch FIFO output), and all entries are cleared. After the jump condition becomes valid, F0 is read and discarded. A call is the same as a jump, except that register 358 is loaded with the return address and is saved in the internal memory C stack by an explicit instruction.

When a branch instruction is executed for the first time, its address is placed in the tag file 366 of the branch target cache 354, and the branch target address is placed in the target address file 364. The replacement policy is preferably least recently used (LRU). The branch target cache 354 may be four-way set associative. The branch target cache 354 stores only one entry per quad aligned word. If there is another jump on the instruction line and this later turns out to be the actual jump, the branch target entry is replaced with the new jump. If the branch target instruction line is not quad aligned, a stall cycle occurs while the rest of the instruction line is fetched. The branch target cache 354 is preferably implemented such that the target address file 364 has a capacity of 64 words of 18 bits each and the tag file 366 has a capacity of 64 words of 16-bits each. The tag file 362 associated with the registers 356 and 358 preferably has a capacity of 16 words of 16-bits each for the return interrupt register 356 and 16 words of 16-bits each for the return call register 358.

For normal fetching of instructions at sequential addresses, the line counter 344 is incremented by four to access sequential rows of instructions in memory. The line counter is incremented when the alignment buffer 316 (FIG. 8) is not full. During fetching of sequential instructions, the output PC of line counter 344 is selected by multiplexer 340.

When an interrupt occurs, the interrupt enables one of the vector interrupt registers 360. The multiplexer 340 selects the output of the vector interrupt registers and substitutes the interrupt address for the next sequential address. The output of adder 342, which represents the return address, is placed in the return interrupt register 356. After the interrupt has been serviced, the return address is retrieved from return interrupt register 356.

If the instruction involves a jump or a call, the return address is placed in the return call register 358. The value of LD is added to the line counter by adder 342, and the output of adder 342 is loaded into branch target cache 354. The value of imm (DA) is added to the output of adder 342 by adder 348, and the result is loaded into branch FIFO 352. As discussed above, the branch FIFO is used in the case of a false jump instruction. The branch FIFO 352 is cleared if the jump prediction is correct. If the prediction is false, entries above the instruction that produced the false jump or call are cleared.

Figure 10:
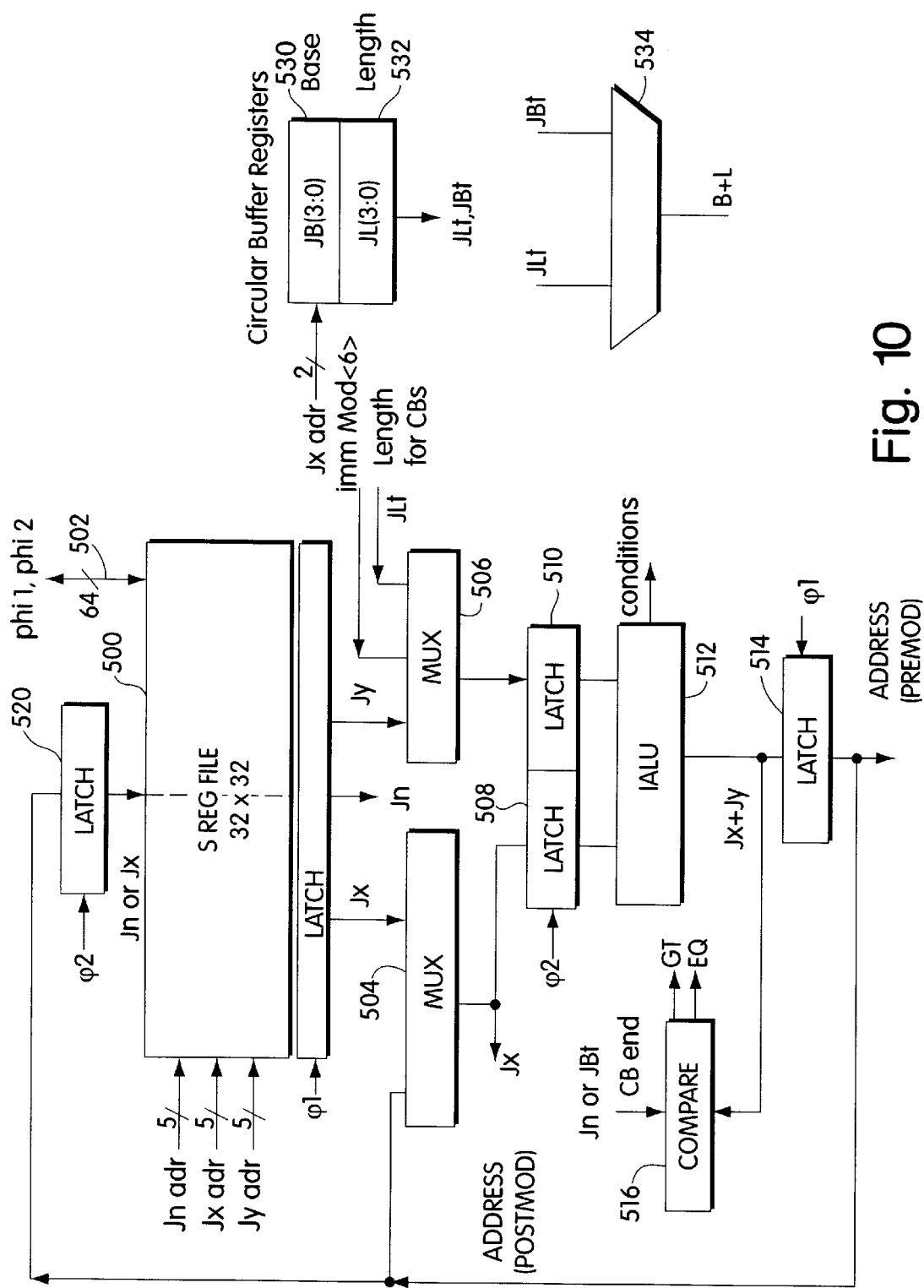
FIG. 10 is a block diagram representative of each integer ALU shown in FIG. 1.

A block diagram of an exemplary embodiment of each of the integer ALU's 72 and 74 is shown in FIG. 10. Each of the integer ALU's 72 and 74 may be used at different times for executing integer ALU instructions and for data address generation. Thus, each integer ALU functions as a data address generator and as an integer ALU. The integer ALU's in control block 24 permit integer ALU instructions to be executed independently of the computation blocks 12 and 14.

A register file 500 preferably has a capacity of 32 words of 32 bits each. A 64 bit bus 502, which may be connected to one of the data buses 60, 62, 64 or 66 through bus interconnect multiplexer 244 (FIG. 5), is configured to permit reading from or writing to the register file 500 in both clock phases. The register file 500 is also configured for three reads (Jn, Jx and Jy), and one write (Jn or Jx) per clock cycle. The Jx output of register file 500 is supplied to a first input of a multiplexer 504, and the Jy output of register file 500 is supplied to a first input of a multiplexer 506. Additional inputs to multiplexer 506 include an immediate modifier (imm Mod) from an instruction and a buffer length JLt from buffer registers 532. The outputs of multiplexers 504 and 506 are supplied to latches 508 and 510, respectively. The contents of latches 508 and 510 are supplied to integer ALU (IALU) 512, which performs an arithmetic operation specified by the instruction. The result from the IALU 512 is supplied to a latch 514 and to a comparator 516. The output of latch 514 is supplied to a second input of multiplexer 504 and to a latch 520. The contents of latch 520 are input to register file 500. The comparator 516 is used for determining when the end of a buffer has been reached during data address generation and may be used to execute integer ALU instructions that include compare operations.

The operation of the integer ALU for executing integer ALU instructions is as follows. The operands are loaded into the register file 500 from the bus 502. The required operands Jx and Jy are supplied through multiplexers 504 and 506 to latches 508 and 510, respectively. Control signals derived from the decoded instruction are supplied to IALU 512, and the required operation is performed. The result is supplied to comparator 516 and is supplied through latch 514 to multiplexer 504 and latch 520. The result may be supplied through multiplexer 504 to latch 508 for use in executing a subsequent instruction and/or may be stored in register file 500. If necessary, the result may be compared with a specified value by comparator 516.

As indicated above, the integer ALU shown in FIG. 10 may be utilized for data address generation. As known in the art, data address generators are typically used for sequential addressing of a data buffer. A data buffer is a region of memory that contains data values of interest. The parameters associated with data address generation include a base B, which indicates the address of the beginning of the buffer, a length L, which indicates the length of the buffer, an index I of a particular address being accessed in the buffer and a modifier M, which represents increments to the index I. Referring again to FIG. 10, the operand Jx corresponds to the index I, and the operand Jy corresponds to the modifier M. The operation I+M is performed by the IALU 512 to provide an address at the output of latch 514. Circular buffer registers are associated with data address generation. A base register 530 contains the base address of a data buffer being addressed. A length register 532 corresponds to the base register and stores the length of the data buffer. In a preferred embodiment, the integer ALU includes four base registers 530 and four length registers 532, thus permitting addressing of multiple data buffers. The appropriate registers 530 and 532 are selected by the MSB's of the index I. An adder 534 adds the base and length and determines an address of the end of each buffer. During address generation, the modifier M is added to the index I on successive cycles to provide new values of the index I for addressing locations in the data buffer.

Each sum I+M is supplied to comparator 516 for comparison with a value that represents the end of the buffer. When address generation is proceeding through the data buffer in a forward direction with increasing addresses, the end of buffer is represented by the value B+L. When address generation is proceeding through the data buffer in a reverse direction with decreasing addresses, the end of buffer is represented by the base value B. When the index reaches the end of buffer as determined by comparison with the value of B+L or B, the length L must be subtracted from (forward direction) or added to (reverse direction) index I in order to cycle through the data buffer again. In this case, the DSP 10 is stalled for one cycle, and the length JLt is selected by multiplexer 506. The length is added to or subtracted from the index I by the IALU 512 to return to the beginning of the buffer. The DSP 10 proceeds with operations after a single cycle stall. As known in the art, a data address generator may supply a premodification address or a post-modification address to the memory. The integer ALU of FIG. 10 provides a pre-modification address at the output latch 514 and a post-modification address at the output of multiplexer 504.

Figure 11A:
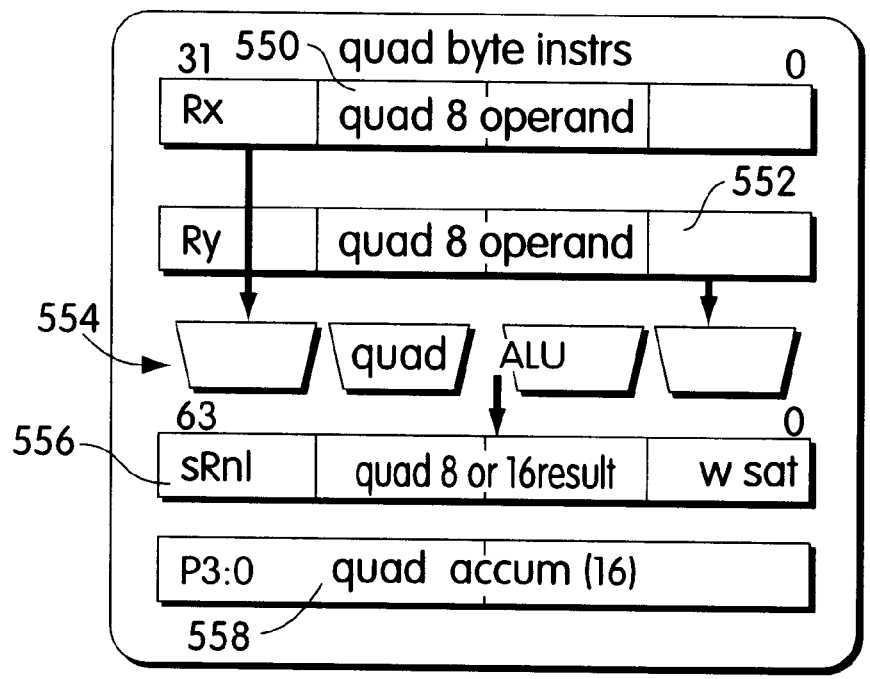
FIGS. 11A–11F are schematic representations of operations performed by the ALU of FIG. 2.
Figure 11B:
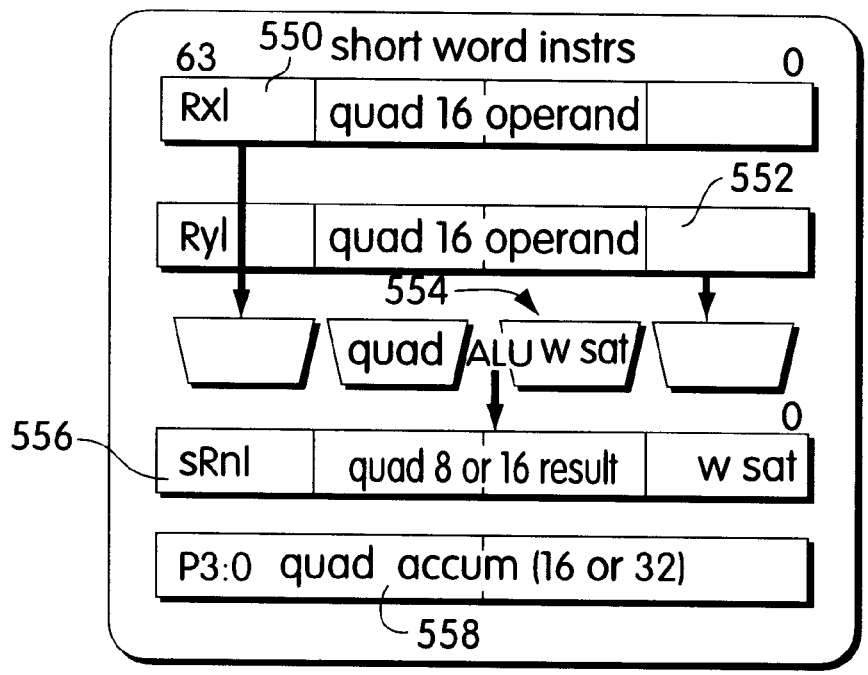
Figure 11C:
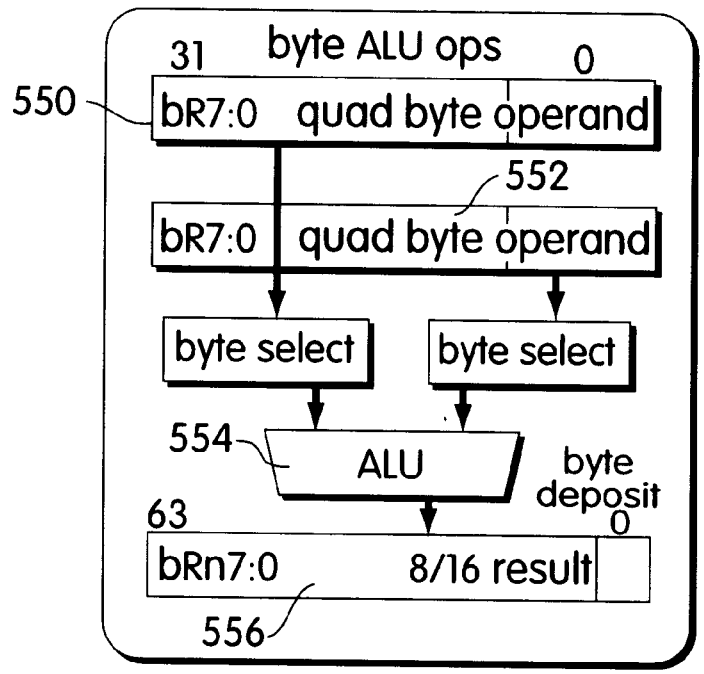
Figure 11D:
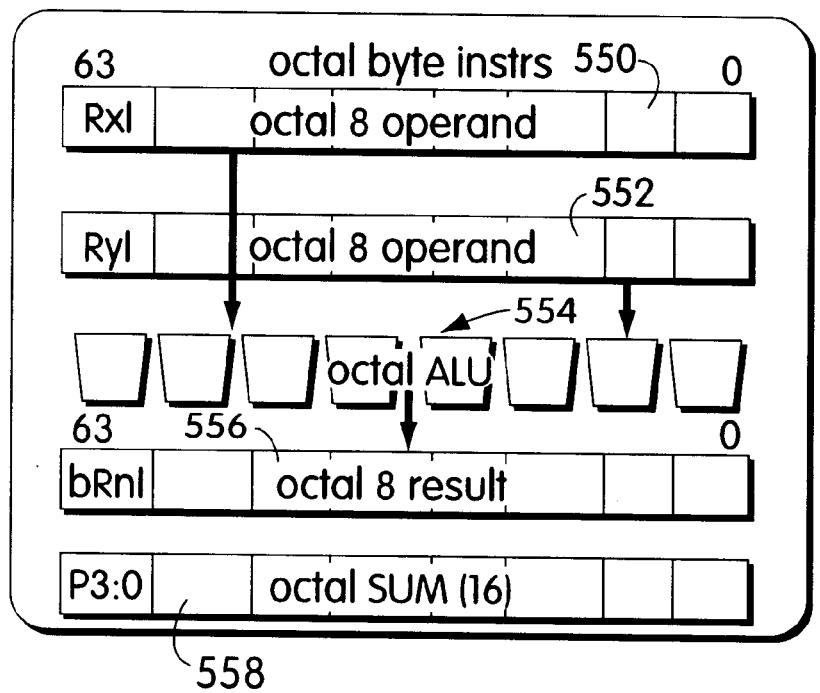
Figure 11E:
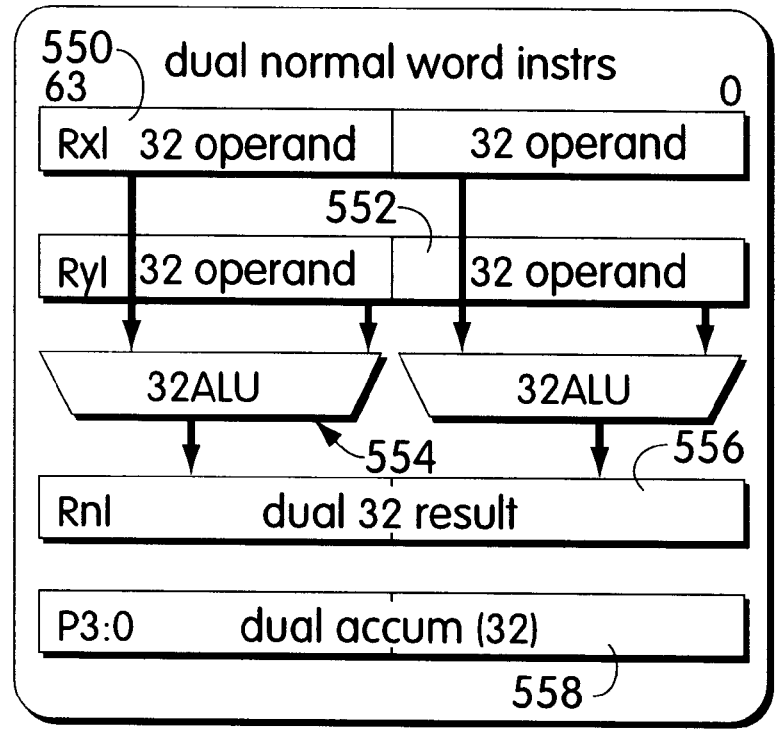
Figure 11F:
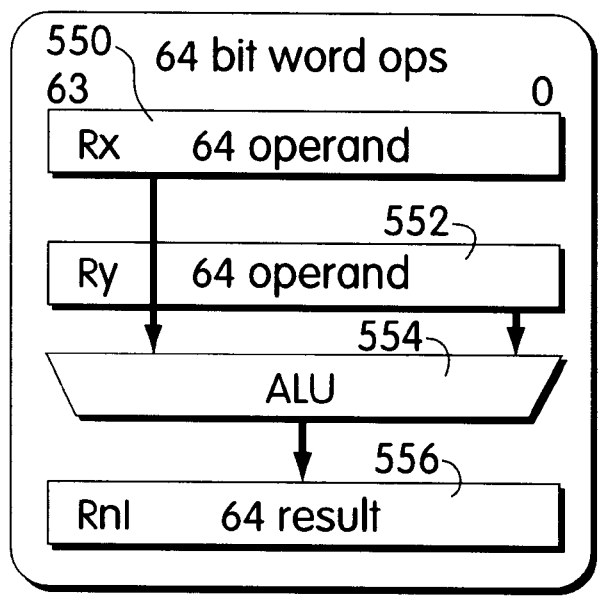

The operations performed by the ALU 122 shown in FIG. 2 are illustrated in FIGS. 11A–11F. The ALU 122 includes input registers 550 and 552, an ALU circuit 554, an output register 556 and an accumulator 558. The ALU circuit 554 may be used as a quad 8-bit byte ALU (FIG. 11A), a quad 16-bit ALU (FIG. 11B), an octal 8-bit byte ALU (FIG. 11D), a dual 32-bit ALU (FIG. 11E) or as a 64-bit ALU (FIG. 11F). The execution of quad byte ALU instructions using the ALU 122 as a quad ALU is illustrated in FIG. 11A. The execution of short word (16-bits) ALU instructions is illustrated in FIG. 11B. The execution of byte ALU instructions is illustrated in FIG. 11C. The execution of octal byte ALU instructions is illustrated in FIG. 11D. The execution of dual normal word (32 bits) ALU instructions is illustrated in FIG. 11E. The execution of 64-bit word ALU instructions illustrated in FIG. 11F.

Figure 12A:
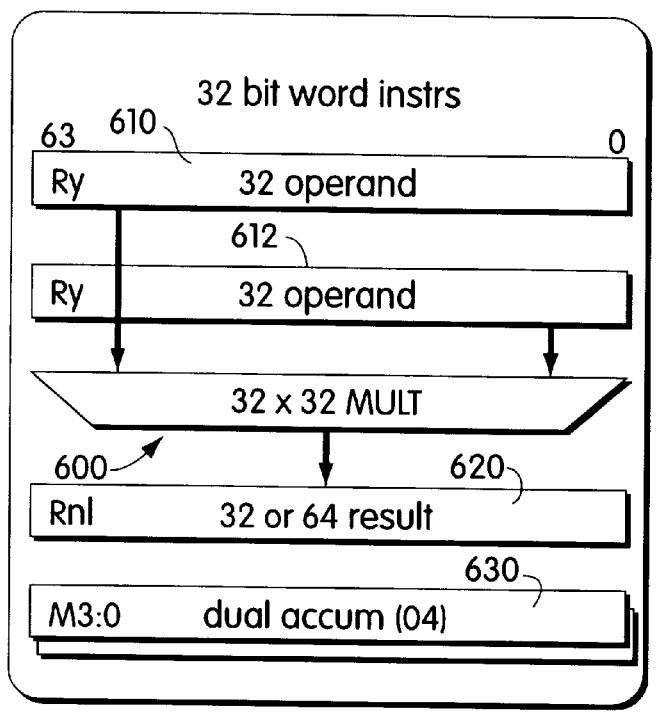
FIGS. 12A–12C are schematic representations of operations performed by the multiplier/accumulator of FIG. 2.
Figure 12B:
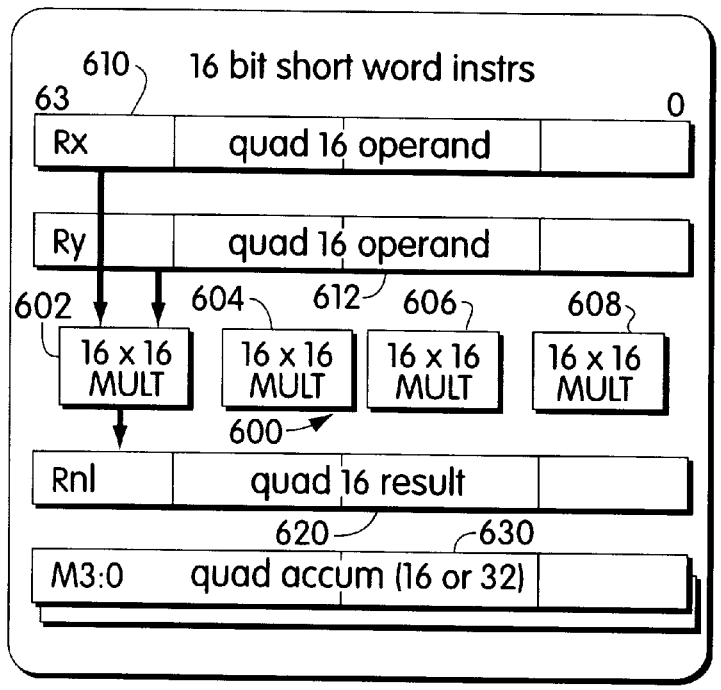
Figure 12C:
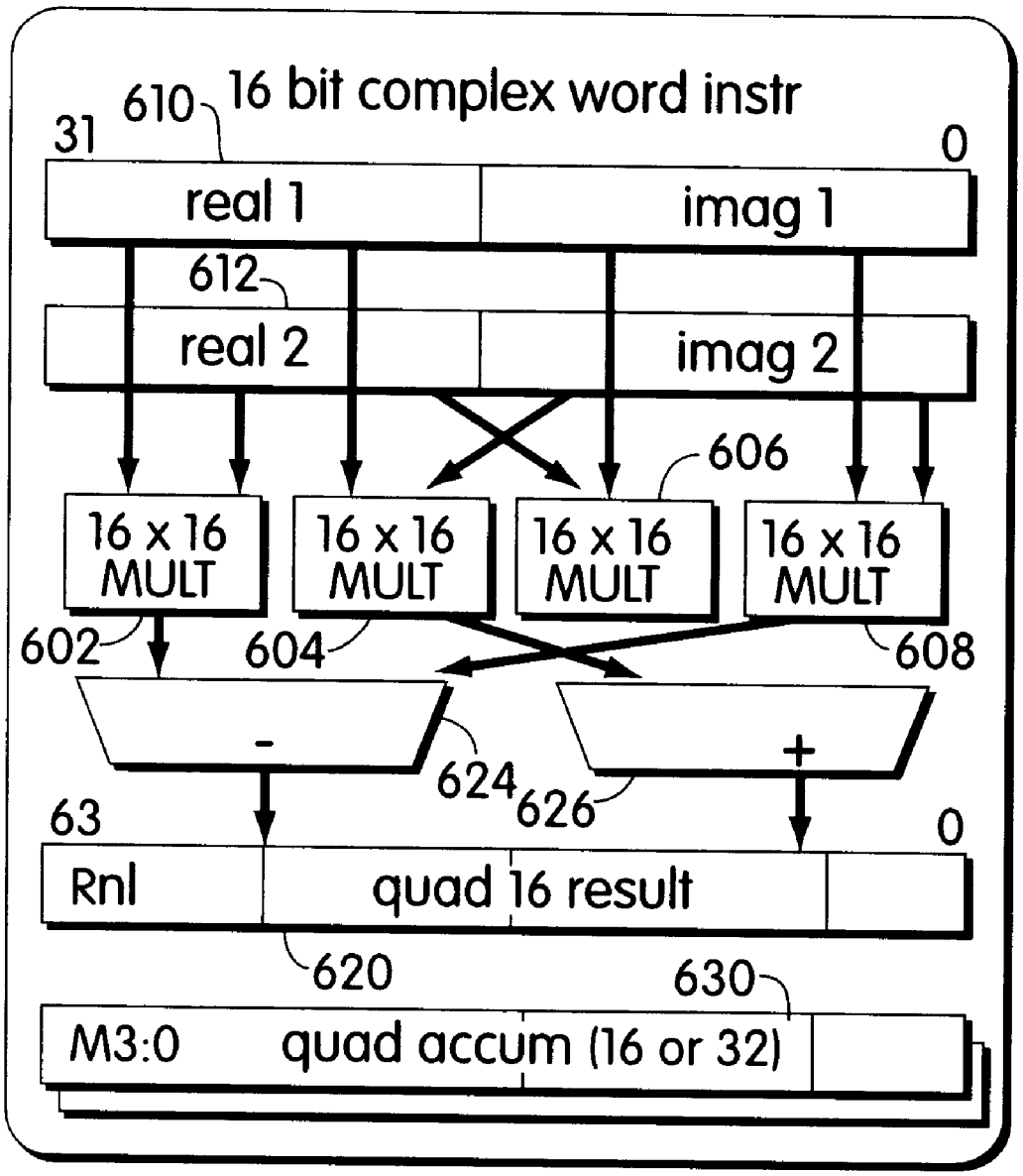

The multiplier/accumulator 120 shown in FIG. 2 supports single precision floating point multiply, 32-bit by 32-bit fixed point multiply or multiply-accumulate (MAC) and quad 16-bit fixed point MAC operations. The operations performed by the multiplier/accumulator 120 are illustrated in FIGS. 12A–12C. The multiplier/accumulator 120 includes input registers 610 and 612, a multiplier 600, an output register 620 and an accumulator 630. The multiplier 600 may be used as a 32-bit by 32-bit multiplier (FIG. 12A) or as quad 16-bit by 16-bit multipliers 602, 604, 606 and 608 (FIGS. 12B and 12C). The execution of 32-bit word multiplier instructions is illustrated in FIG. 12A. The execution of 16-bit short word multiplier instructions is illustrated in FIG. 12B. The use of the multiplier/accumulator 120 to perform quad 16-bit complex word multiplier instructions is shown in FIG. 12C.

In FIG. 12B, the register 610 supplies 16-bit words A0, A1, A2 and A3 to the respective 16-bit multipliers, and register 612 supplies 16-bit words B0, B1, B2 and B3 to the respective multipliers. The results of the 16-bit multiply operations are placed in register 620.

In FIG. 12C, the multiplier/accumulator 120 is used to execute 16-bit complex word instructions. Sixteen bit real and imaginary components of complex operands are placed in registers 610 and 612. The real 1 and real 2 components are supplied to multiplier 602. The real 1 and imaginary 2 components are supplied to multiplier 604. The real 2 and imaginary 1 components are supplied to multiplier 606. The imaginary 1 and imaginary 2 components are supplied to multiplier 608. The outputs of multipliers 602 and 608 are summed by an adder 624, and the outputs of multipliers 604 and 606 are summed by an adder 626. The results are placed in register 620. In this operating mode, the multiplier/accumulator 120 performs four multiplies and four adds with one cycle throughput.

Figure 13A:
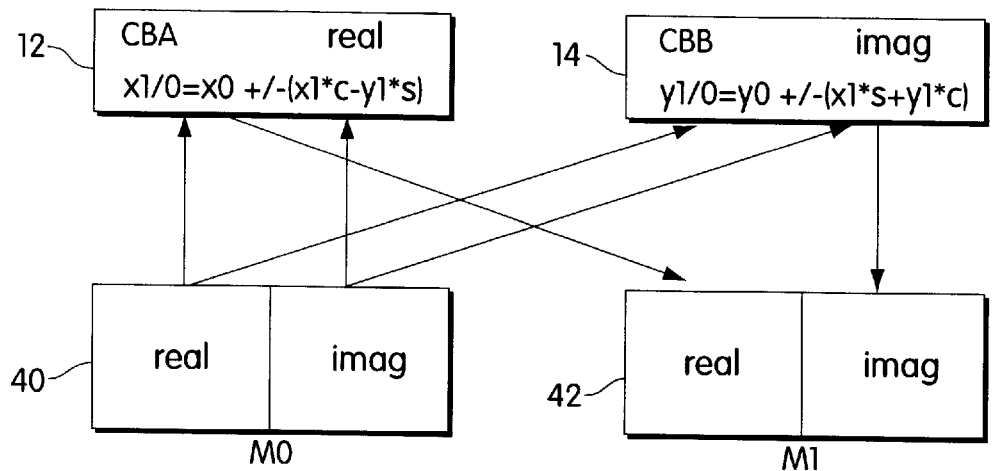
FIGS. 13A–13C illustrate examples of FFT butterfly computations by the digital signal processor of FIG. 1.
Figure 13B:
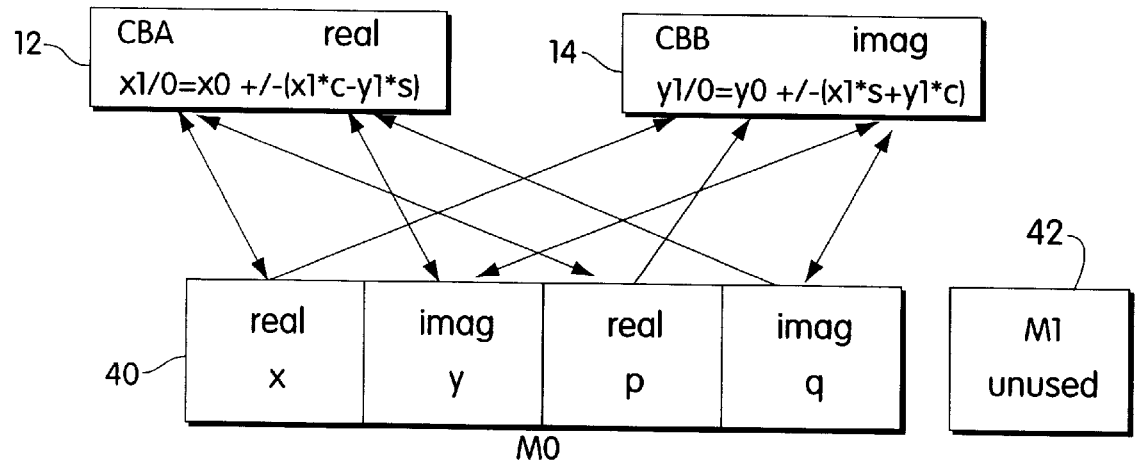
Figure 13C:
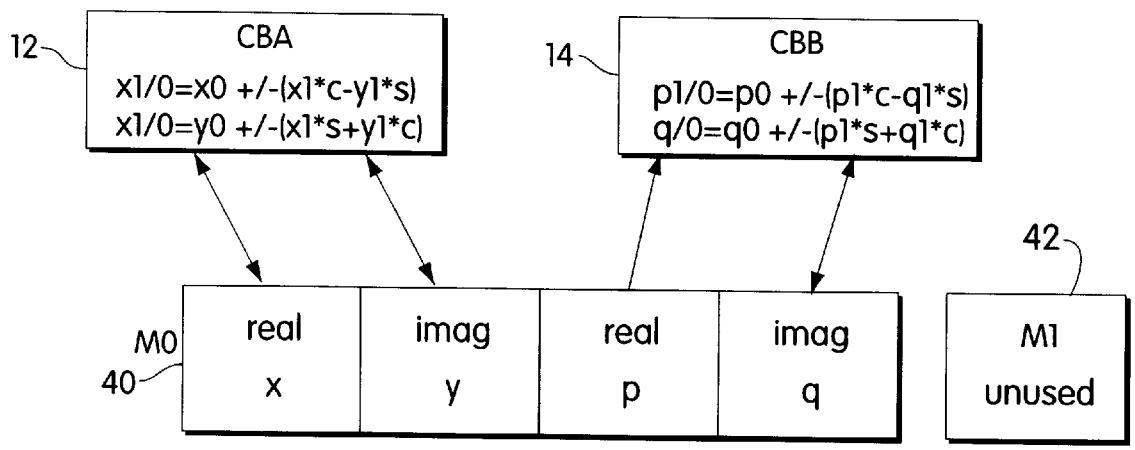

Examples of fast Fourier transform (FFT) butterfly computations are illustrated in FIGS. 13A–13C. In FIG. 13A, dual word memory accesses are used. The real and imaginary components are stored in memory bank 40 and are read from memory bank 40 to both computation block 12 and computation block 14. Computation block 12 performs computations on the real components, and computation block 14 performs computations on the imaginary components. The results of the computations are written from computation blocks 12 and 14 to memory bank 42. Each dual word in memory banks 40 and 42 includes a real component and an imaginary component. In the dual word memory access mode shown in FIG. 13A, memory banks 40 and 42 are both used. As a result, spare cycles are not available for access to memory banks 40 and 42 by DMA address generators 76 and 78.

In the example of FIG. 13B, quad word accesses to memory bank 40 are utilized. Real components X and P, and imaginary components Y and Q are supplied from memory bank 40 to computation blocks 12 and 14. The computation block 12 performs real component computations, and computation block 14 performs imaginary component computations. The results are written to appropriate locations in memory bank 40 as quad data words. In the operating mode illustrated in FIG. 13B, only memory bank 40 is utilized for computations, and memory bank 42 is free for access by DMA address generators 76 and 78.

In the example of FIG. 13C, real components X and P and imaginary components Y and Q are stored in memory bank 40 as quad data words. In this case, real component X and imaginary component Y are supplied to computation block 12, and real component P and imaginary component Q are supplied to computation block 14. Each computation block 12 and 14 performs a complete FFT butterfly computation. The results are written in appropriate locations in memory bank 40 as quad data words. In this case, only memory bank 40 is utilized for computations, and memory bank 42 is free for access by DMA address generators 76 and 78.

Figure 14A:
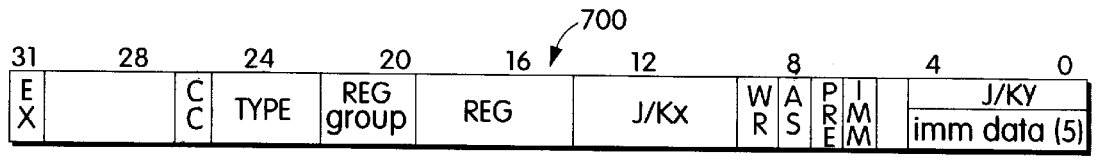
FIGS. 14A–14E illustrate examples of instructions used in the digital signal processor of FIG. 1.

Examples of instructions for the DSP 10 are illustrated in FIGS. 14A–14E. Each of the instructions is a 32-bit instruction. Like fields in different instructions are given the same names. A memory move instruction 700 is illustrated in FIG. 14A. The fields of the instruction are as follows. EX is the instruction line bit which indicates whether the instruction begins or ends an instruction line. When CC=1, the instruction uses the branch condition on the same instruction line if specified. TYPE specifies the type of memory access, i.e., single, dual or quad, and the computation block. REG GROUP specifies a register group in computation block 12 or 14, control block 24 or external port 28. REG specifies a register within the register group. J/kx and J/ky specify an address in a memory bank. AS selects integer ALU 72 or 74. PRE indicates premodify or post modify addressing. IMM indicates immediate data mode.

Figure 14B:
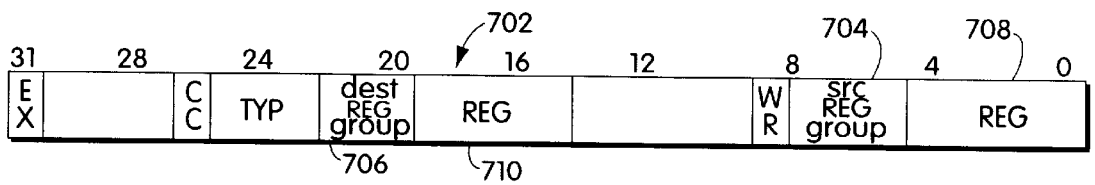

An instruction 702 for transfer of data between registers is illustrated in FIG. 14B. A source register group field 704 and a destination group register field 706 are included in the instruction 702. Register fields 708 and 710 correspond to register group fields 704 and 706, respectively.

Figure 14C:
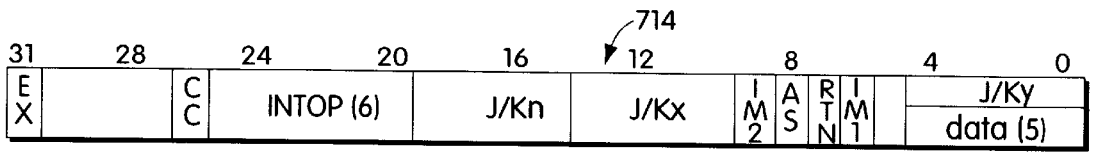

An integer operation instruction 714 is illustrated in FIG. 14C. An INTOP field specifies the integer operation to be performed. J/kn, J/kx and J/ky fields specify memory locations of operands. Optional immediate data may be included in a second 32-bit word.

Figure 14D:
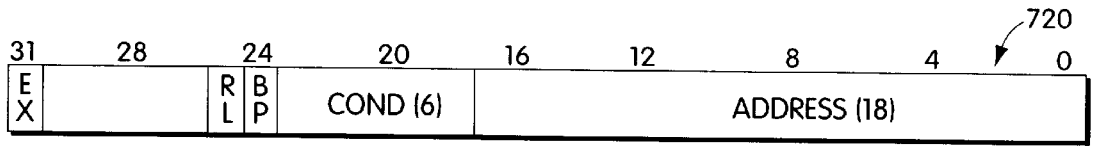

A jump/call instruction 720 is illustrated in FIG. 14D. An RL field indicates relative addressing. A BP field indicates that branch prediction is present in the branch cache 354 (FIG. 9). A COND field specifies the condition for which a jump/call occurs. An ADDRESS field contains the jump/call address.

Figure 14E:
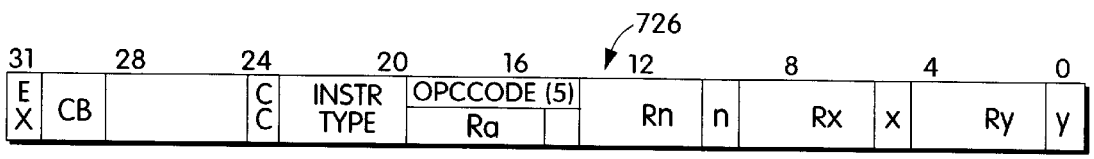

A compute instruction 726 is illustrated in FIG. 14E. An INSTR TYPE field species a category of compute operation. An OP CODE field specifies the operation to be performed. The OP CODE also specifies whether the compute instruction is for one or the other, or both, of the computation blocks 12 and 14. Rn, Rx and Ry fields specify locations of operands in the register file 100 (FIG. 2).

The DSP 10 shown in FIG. 1 and described above includes two computation blocks 12 and 14 and three memory banks 40, 42 and 44. It will be understood that the memory transfer techniques described herein, where single, dual or quad operands are selectably accessed in a memory bank in a single clock cycle and where multiple instructions are accessed in a single clock cycle, can be utilized in a digital signal processor having a single computation block. Furthermore, these memory transfer techniques can be utilized in a digital signal processor including two memory banks and an instruction cache. In this configuration, one of the memory banks stores both instructions and operands. Instructions being executed may be placed in the instruction cache, thereby permitting operands to be accessed simultaneously in both memory banks. As described above, the DSP includes circuitry for selectably accessing single, dual or quad operands in one or both of the memory banks during each clock cycle and providing the single, dual or quad operands to one or more computation blocks.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A digital signal processor comprising:
a memory including a first memory bank for storing instructions and second and third memory banks for storing operands for digital signal computations;
a core processor connected to said first, second and third memory banks, said core processor comprising:
a program sequencer for generating instruction addresses for fetching selected ones of said instructions from said first memory bank; and
a computation unit for performing said digital signal computations using said instructions and said operands, said computation unit including a first computation block for performing a first subset of said digital signal computations using a first subset of said instructions and a first subset of said operands, and a second computation block for performing a second subset of said digital signal computations using a second subset of said instructions and a second subset of said operands; and
transfer selection means responsive to said instructions for simultaneously addressing quad operands in a single row of one or both of said second and third memory banks and selectably and simultaneously providing one, two or four of said quad operands to said computation unit for performing said digital signal computations, wherein each of said second and third memory banks is organized as quad word rows and wherein said transfer selection means includes means for selectably accessing single, dual or quad locations in a selected quad word row and each of said first and second computation blocks includes means for selecting the operands accessed in one or both of said second and third memory banks.

2. A digital signal processor as defined in claim 1 wherein said operands each comprise 32 bits, such that said second and third memory banks each provide up to 128 bits during each clock cycle.

3. A digital signal processor as defined in claim 1 wherein said transfer selection means further includes means for selectably writing single, dual or quad data words in one or both of said second and third memory banks during each clock cycle.

4. A digital signal processor as defined in claim 1 wherein said program sequencer includes means for fetching an instruction line including plural instructions from said first memory bank during each clock cycle.

5. A digital signal processor as defined in claim 1 wherein said first and second subsets of said instructions are the same.

6. A digital signal processor as defined in claim 1 wherein said first and second subsets of said instructions are different.

7. A digital signal processor as defined in claim 1 further including first data and address buses interconnecting said core processor and said first memory bank, second data and address buses interconnecting said core processor and said second memory bank, and third data and address buses interconnecting said core processor and said third memory bank.

8. A digital signal processor as defined in claim 7 wherein each of said first, second and third data buses is 128 bits wide for transferring up to four data words of 32 bits each during each clock cycle.

9. A digital signal processor as defined in claim 1 wherein said first and second computation blocks each include a register file for temporary storage of operands and results, a multiplier for performing multiplication operations, an ALU for performing arithmetic operations and a shifter for performing shifting operations.

10. A digital signal processor as defined in claim 1 wherein said second and third memory banks are organized as quad word rows and wherein said transfer selection means includes means for enabling said first and second computation blocks to write to different words of a selected quad word row during each clock cycle.

11. A digital signal processor as defined in claim 1 wherein said transfer selection means includes means for selectably transferring dual operands in a quad operand to one or both of said first and second computation blocks during each clock cycle.

12. A digital signal processor as defined in claim 1 wherein said transfer selection means includes means for selectably transferring single operands in a dual operand to one or both of said first and second computation blocks during each clock cycle.

13. A digital signal processor as defined in claim 1 wherein said transfer selection means includes means for selectably transferring a quad operand to one or both of said first and second computation blocks during each clock cycle.

14. A digital signal processor as defined in claim 1 wherein said transfer selection means includes means for selectably accessing up to eight operands of 32 bits each during each clock cycle.

15. A digital signal processor as defined in claim 1 wherein said first memory bank is organized as quad word rows and wherein said instructions are stored in first memory bank as instruction lines of up to four instructions, wherein the instructions of an instruction line are stored in one or two quad word rows of said first memory bank.

16. A digital signal processor as defined in claim 15 wherein said core processor further includes an instruction alignment buffer for aligning instructions that are read from said first memory bank on different clock cycles but are required to be executed in one clock cycle.

17. A digital signal processor as defined in claim 1 wherein said transfer selection means includes means for writing results of said digital signal computations from said computation unit to one or both of said second and third memory banks during each clock cycle.

18. A digital signal processor as defined in claim 1 further including a first data address generator for generating addresses for fetching selected ones of said operands from said second memory bank and a second data address generator for generating addresses for fetching selected ones of said operands from said third memory bank.

19. A digital signal processor comprising:
a memory including a first memory bank for storing instructions and second and third memory banks for storing operands for digital signal computations;
a core processor comprising:
a program sequencer for generating instruction addresses for fetching selected ones of said instructions from said first memory bank; and
a computation unit for performing said digital signal computations using said instructions and said operands, said computation unit including a first computation block for performing a first subset of said digital signal computations using a first subset of said instructions and a first subset of said operands, and a second computation block for performing a second subset of said digital signal computations using a second subset of said instructions and a second subset of said operands;
first data and address buses interconnecting said core processor and said first memory bank, second data and address buses interconnecting said core processor and said second memory bank, and third data and address buses interconnecting said core processor and said third memory bank, said first, second and third data buses each being 128 bits wide; and
transfer selection means responsive to said instructions for simultaneously addressing quad operands of 32 bits each in a single row of one or more of said second and third memory banks and selectably and simultaneously providing one, two or four of said quad operands to said computation unit for performing said digital signal computations, wherein each of said second and third memory banks is organized as quad word rows and wherein said transfer selection means includes means for selectably accessing single, dual or quad locations in a selected quad word row and each of said first and second computation blocks includes means for selecting the operands accessed in one or both of said second and third memory banks.

20. A method for digital signal processing comprising the steps of:
storing instructions for digital signal computations in a first memory bank and storing operands for the digital signal computations in a second memory bank;
generating instruction addresses for fetching selected ones of said instructions from said first memory bank;
simultaneously addressing quad operands in a single row of said second memory bank and selectably and simultaneously providing one, two or four of said quad operands to a computation unit for performing said digital signal computations, said computation unit including a first computation block for performing a first subset of said digital signal computations using a first subset of said instructions and a first subset of said operands, and a second computation block for performing a second subset of said digital signal computations using a second subset of said instructions and a second subset of said operands, wherein said second memory bank is organized as quad word rows and wherein the steps of simultaneously addressing quad operands and selectably and simultaneously providing one, two or four of said quad operands include accessing single, dual or quad locations in a selected quad row and each of said first and second computation blocks selects the operands accessed in said second memory bank; and
said computation unit performing said digital signal computations using said instructions from said first memory bank and said operands from said second memory bank.

21. A method as defined in claim 20 further including the step of storing operands for the digital signal computations in a third memory bank and wherein the steps of simultaneously addressing quad operands and selectably and simultaneously providing one, two or four of said quad operands include selectably accessing said single, dual or quad operands in one or both of said second and third memory banks during each clock cycle.

22. A method as defined in claim 20 further including the steps of storing instructions being executed in an instruction cache, fetching instructions for execution from said instruction cache and storing operands in said first memory bank, and wherein the step of selectably accessing single, dual or quad operands includes selectably accessing single, dual or quad operands in one or both of said first and second memory banks.

23. A digital signal processor comprising:
a memory including a first memory bank for storing instructions and a second memory bank for storing operands for digital signal computations;

a core processor connected to said first and second memory banks, said core processor comprising:
  a program sequencer for generating instruction addresses for fetching selected ones of said instructions from said first memory bank; and
  a computation unit for performing said digital signal computations using said instructions and said operands, said computation unit including a first computation block for performing a first subset of said digital signal computations using a first subset of said instructions and a first subset of said operands, and a second computation block for performing a second subset of said digital signal computations using a second subset of said instructions and a second subset of said operands; and
transfer selection means responsive to said instructions for simultaneously addressing quad operands in a single row of said second memory bank and selectably and simultaneously providing one, two or four of said quad operands to said computation unit for performing said digital signal computations, wherein said second memory bank is organized as quad word rows and wherein said transfer selection means includes means for selectably accessing single, dual or quad locations in a selected quad word row and each of said first and second computation blocks includes means for selecting the operands accessed in said second memory bank.

24. A digital signal processor comprising:
a memory including a first memory bank for storing instructions and operands and a second memory bank for storing operands for digital signal computations;
a core processor connected to said first and second memory banks, said core processor comprising:
  an instruction cache for storing a subset of said instructions;
  a program sequencer for generating instruction addresses for fetching selected ones of said instructions from said instruction cache or said first memory bank; and
  a computation unit for performing said digital computations using said instructions and said operands, said computation unit including a first computation block for performing a first subset of said digital signal computations using a first subset of said instructions and a first subset of said operands, and a second computation block for performing a second subset of said digital signal computations using a second subset of said instructions and a second subset of said operands; and
transfer selection means responsive to said instructions for simultaneously addressing quad operands in a single row of one or both of said first and second memory banks and selectably and simultaneously providing one, two or four of said quad operands to said computation unit for performing said digital signal computations, wherein each of said first and second memory banks is organized as quad word rows and wherein said transfer selection means includes means for selectably accessing single, dual or quad locations in a selected quad word row and each of said first and second computation blocks includes means for selecting the operands accessed in one or both of said first and second memory banks.

* * * * *